(12) United States Patent
Ueda et al.

(10) Patent No.: US 6,379,850 B1
(45) Date of Patent: Apr. 30, 2002

(54) REWRITABLE THERMOSENSIBLE RECORDING MATERIAL, A PRODUCTION METHOD THEREOF AND A REWRITABLE THERMOSENSIBLE RECORDING MEDIUM

(75) Inventors: Hideaki Ueda, Kishiwada; Tsuyoshi Nozaki, Tsuchiura; Shoji Kotani, Otsu, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/338,741

(22) Filed: Jun. 23, 1999

(30) Foreign Application Priority Data

| Jun. 25, 1998 | (JP) | 10-179089 |
| Jun. 25, 1998 | (JP) | 10-179090 |
| Jul. 22, 1998 | (JP) | 10-206788 |
| Mar. 31, 1999 | (JP) | 11-093011 |

(51) Int. Cl.⁷ .................. G01K 11/12; C09K 19/42; B41M 5/00

(52) U.S. Cl. .............. 430/20; 349/72; 349/88; 349/185; 349/186

(58) Field of Search .............. 552/544; 430/20; 349/72, 88, 185, 186

(56) References Cited

U.S. PATENT DOCUMENTS 3,594,126 A * 7/1971 Ferguson et al. ............ 250/83
3,650,603 A * 3/1972 Heilmeier et al. ........... 350/160

(List continued on next page.)

FOREIGN PATENT DOCUMENTS

| JP | 49-066976 A2 | * | 1/1976 |
| JP | 57-079918 | * | 5/1982 |
| JP | 01-075404 | * | 3/1989 |
| JP | 10-321026 | * | 12/1998 |

OTHER PUBLICATIONS

Marcelis, A.T.M., et al. "Thermal and optical properties of chiral twin liquid crystalline . . . ", J. Mater. Chem., vol. 6(9) pp. 1469–1472, 1996.*

Akopova, O.B., et al., "Synthesis and mesomorphic and spectral properties of cholesterol . . . " Russ. J. Gen. Chem., vol. 67(3). pp. 470–473, 1997.*

(List continued on next page.)

Primary Examiner—Martin Angebranndt
(74) Attorney, Agent, or Firm—Sidley Austin Brown & Wood LLP

(57) ABSTRACT

A rewritable thermosensible recording material shown by the following chemical formula. This recording material can be produced by condensing a derivative of dicarboxylic acid and cholesterol or by making halide dicarboxylic acid and cholesterol react to each other. By locating this material purely or as a mixture between a base layer and a transparent protective layer, a rewritable thermosensible recording medium can be obtained.

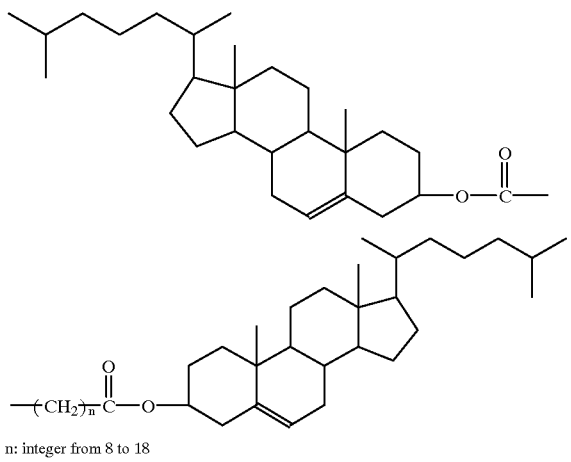

n: integer from 8 to 18

13 Claims, 12 Drawing Sheets

U.S. PATENT DOCUMENTS

| | | | | |
|---|---|---|---|---|
| 4,060,910 A | * | 12/1977 | Gell, Jr. | 350/160 |
| 4,068,925 A | * | 1/1978 | Tani et al. | 350/150 |
| 4,161,557 A | * | 7/1979 | Suzuki et al. | 428/1 |
| 4,610,510 A | * | 9/1986 | Funada et al. | 350/334 |
| 4,859,360 A | * | 8/1989 | Suzuki et al. | 252/299.7 |
| 5,593,691 A | * | 1/1997 | Eugster et al. | 424/461 |
| 6,103,431 A | * | 8/2000 | Tamaoka et al. | 430/20 |

OTHER PUBLICATIONS

Nobuyuki Tamaoki, Alexander V. Parfenov, Atsushi Masaki and Hiro Matsuda, "Rewritable Full–Color Recording on a Thin Solid Film of a Cholesteric Low–Molecular–Weight Compound", *Advanced Materials,* 9, No. 14 (1997), pp. 1102–1104.

* cited by examiner

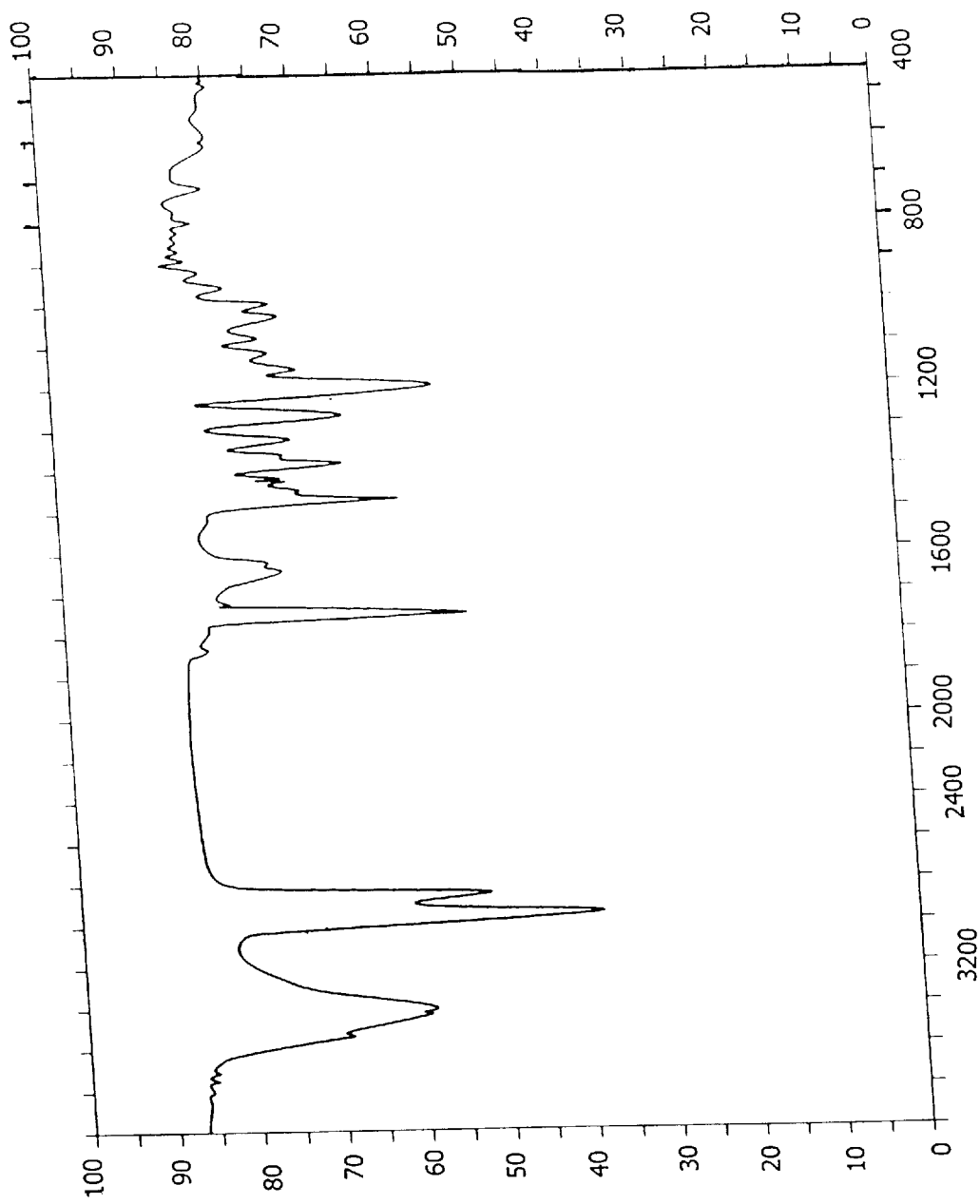
F I G. 1

F I G. 1 0
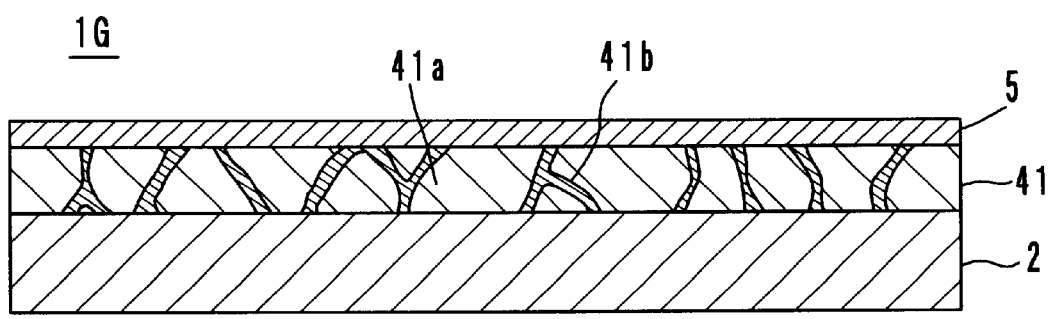
F I G. 1 1
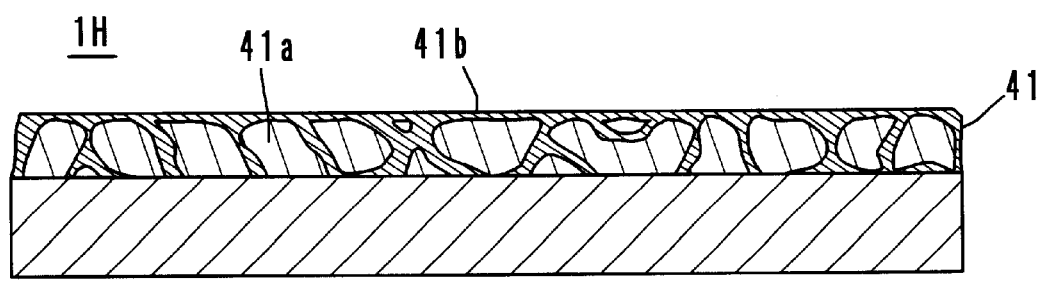

REWRITABLE THERMOSENSIBLE RECORDING MATERIAL, A PRODUCTION METHOD THEREOF AND A REWRITABLE THERMOSENSIBLE RECORDING MEDIUM

This application is based on applications Nos. 10-179089, 0-179090, 10-206788 and 11-93011 filed in Japan, the contents of which are hereby incorporated by reference.

BACKGROUND OF THE INVENTION

1. Field of the Invention

The present invention relates to a rewritable thermosensible recording material, a production method thereof and a rewritable thermosensible recording medium.

2. Description of Related Art

Conventionally, polymer cholesteric liquid crystal and low-molecular cholesteric liquid crystal are known as rewritable thermosensible recording materials. Polymer cholesteric liquid crystal is theoretically capable of changing its display color according to its temperature; such a change in color, however, requires a time on the order of a minute, which is an obstacle to practical use. As low molecular cholesteric liquid crystal, as disclosed in Advanced Materials, 1997. 9. (14), 1102–1104, only dicholesterol compounds are known. Such dicholesterol compounds are capable of changing their colors only within a narrow temperature range and cause chromatic unevenness, i.e., are poor in reproducibility.

SUMMARY OF THE INVENTION

An object of the present invention is to provide an organic low molecular rewritable thermosensible recording material and a production method thereof.

Another object of the present invention is to provide a rewritable thermosensible recording medium which is capable of displaying a full-color image at a high speed.

In order to attain the objects, a rewritable thermosensible recording material according to the present invention is shown by the following general chemical formula (A).

n: integer from 8 to 18

x: halogen atom
n: integer from 8 to 18

Examples of the basic compounds which are usable as the catalyst are hydroxide of alkaline metals, carbonate, hydrogencarbonate, alcholate. Also, organic bases such as quarternary ammonium salt, aliphatic amine, aromatic amine and dimethyl formacide can be used. It is preferred to use an organic base. Examples of the acidic compounds which are usable as the catalyst are various kinds of Lewis acid without any particular limitations. Typically, sulfuric acid, hydrochloric acid, nitric acid, boric acid etc. can be used.

For the reaction, the compounds (B), (C) and the catalyst are dissolved or dispersed in a suitable solvent, which can be selected from generally used various solvents. It is especially preferred to use a halogen solvent such as dichloromethane, dichloroethane, chloroform, trichloroethane, etc. or a cyclic ether solvent such as dioxane, tetrahydrofuran, etc.

The reaction may be carried out under atmospheric pressure in a temperature within a range from a room temperature to 150° C. and may be carried out with pressure applied. After the reaction, the target compound can be obtained from the reactant by an ordinary method, for example, an ordinary separate purifying method such as filteration, concentration, crystallization, fractional distillation, recrystallization, etc. If a mixture is obtained after the reaction, the separate purification can be carried out by thin layer chromatography, liquid chromatography, column chromatography etc.

A rewritable thermosensible recording material according to the present invention is specifically shown by the above

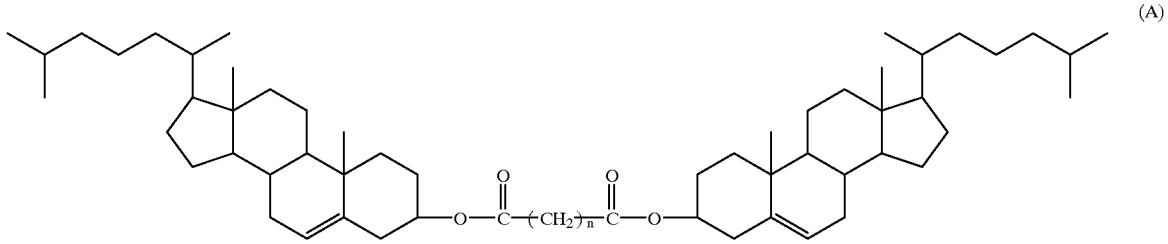

n: integer from 8 to 18

The rewritable thermosensible recording material can be produced by condensing a derivative of dicarboxylic acid shown by the following general chemical formula (B) and cholesterol or by making halide dicarboxylic acid shown by the following general chemical formula (C) and cholesterol react to each other. It is possible to add a basic compound or an acidic compound as a catalyst.

formula (A) and can be any of eleven compounds in which n is any integer from 8 to 18. The reaction to produce such a liquid crystal material is carried out for 30 minutes to ten hours in a temperature within a range from a room temperature to 150° C. The completion of the reaction can be confirmed by use of thin layer chromatography, liquid chromatography, etc. After the reaction, the target liquid crystal compound can be obtained from the reactant by an ordinary separate purifying method such as filteration, concentration, crystallization, fractional distillation, recrystallization, etc. If a byproduct as well as the target liquid crystal compound are obtained simultaneously, the separate purifycation can be carried out by gas chromatography, liquid chromatography, column chromatography, a thin layer chromatography, etc.

A rewritable thermosensible recording medium according to the present invention has a recording layer containing the above-described rewritable thermosensible recording material. The recording layer contains the rewritable thermosensible recording material purely or as a mixture. This recording layer is located between a sheet-like base layer and a transparent protective layer. The recording layer is heated to a specified temperature by a heating device, for example, a thermal head or a hot stamp so as to show a specified color. Thereafter, the recording layer is heated to a specified temperature so that the color display can be erased, and thus, the recording layer is rewritable. Further, it is possible to add a photo-thermo converting agent such as an infrared absorbent to the recording layer or to a neighboring layer, which permits writing of an image by radiation of a laser.

Another rewritable thermosensible recording medium according to the present invention comprises a sheet-like base layer and a recording layer, and the recording layer contains at least two low molecular cholesteric liquid crystal compounds which exhibit a cholesteric phase in a temperature higher than a room temperature, in which the low molecular cholesteric liquid crystal compounds reflect light within a visible wavelength range according to the temperature, and are solidified while remaining in the reflective state by being cooled rapidly from the temperature.

In the recording medium, because the base layer is sheet-like and because at least two low molecular cholesteric liquid crystal compounds are used as the rewritable thermosensible recording material of the recording layer, it is possible to display a desired color at a high speed by heating the recording medium to a specified temperature according to the information to be recorded, and full-color display is also possible. Also, the displayed information can be erased by reheating of the recording medium. This recording medium can display a large number of colors without chromatic unevenness and can change its color within a wide temperature range, and the temperature control is easy.

Typical combinations of low molecular cholesteric liquid crystal compounds which can be used for the recording medium according to the present invention are shown by the following chemical formulas (D), (E), (F), (G), (H), (I) and (J).

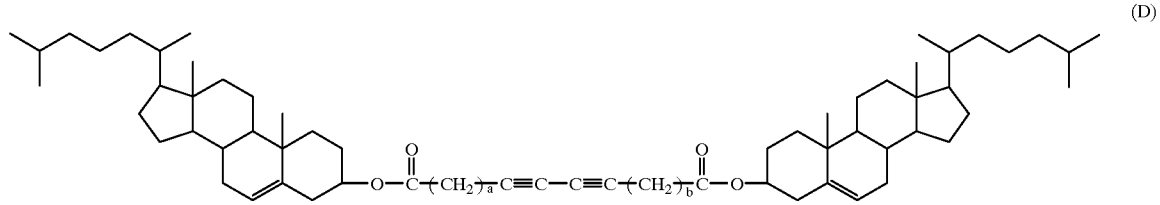

(D)

$5 \leq a + b \leq 20$
a, b: integer

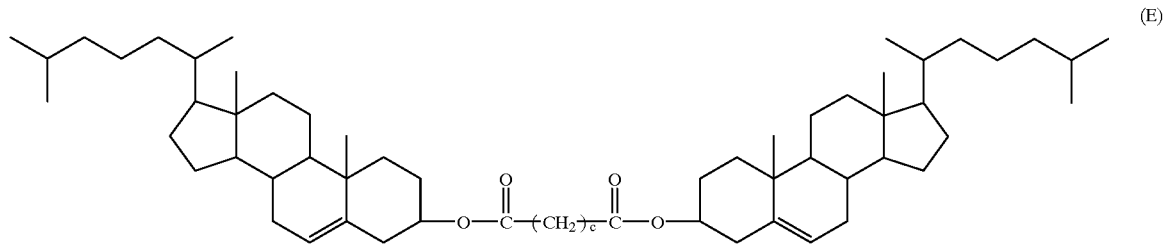

(E)

c: integer from 5 to 20

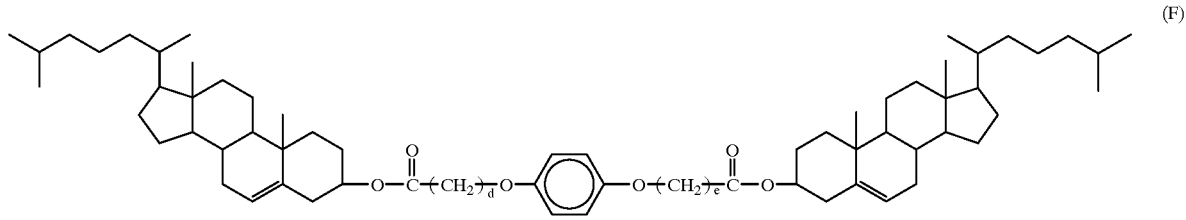

(F)

$5 \leq d + e \leq 20$
d, e: integer

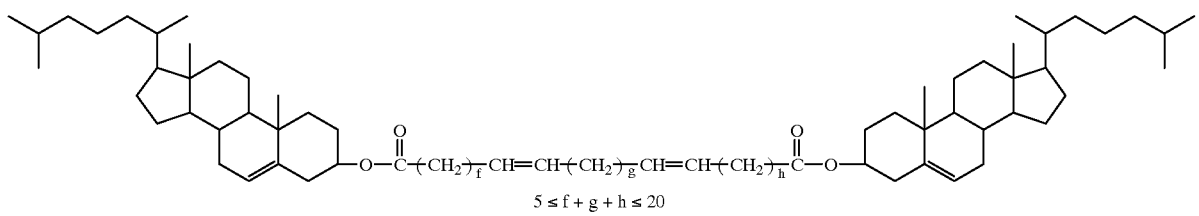

(G)

$5 \leq f + g + h \leq 20$ f, g, h: integer

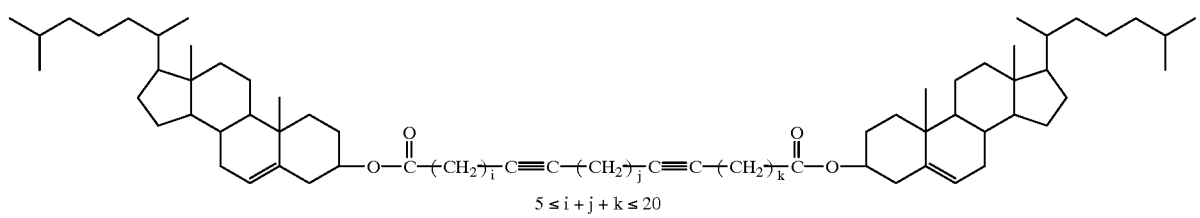

(H)

$5 \leq i + j + k \leq 20$ i, j, k: integer
(j ≠ 0)

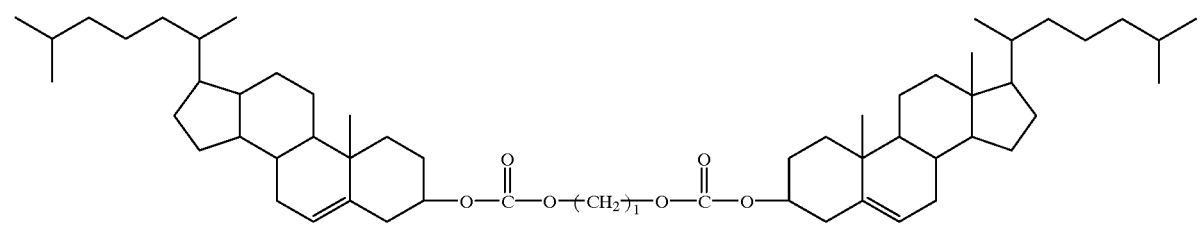

(I)

l: integer from 5 to 20

(J)

m: integer from 5 to 20

Such a combination may be a combination of low molecular cholesteric liquid crystal compounds of the same fundamental structure with different alkyl chain lengths and may be a combination of low molecular cholesteric liquid crystal compounds of different fundamental structures. Also, it is possible to combine three or more low molecular cholesteric liquid crystal compounds in consideration for the performance of the compounds. Besides the above compounds, various low molecular cholesteric liquid crystal compounds with cholesterol groups are usable.

It is preferred that at least one of the used low molecular cholesteric liquid crystal compounds has a molecular weight of 1000 to 1500. If the molecular weights of the low molecular cholesteric liquid crystal compounds are 1000 or less, the recording layer will be poor in memory performance. If the molecular weights of the low molecular cholesteric liquid crystal compounds are 1500 or more, the recording layer will be poor in responsibility to writing, and the transition temperature to the cholesteric phase of the liquid crystal will be too high.

Another rewritable thermosensible recording medium according to the present invention comprises a sheet-like base layer and a recording layer, and the recording layer contains a low-molecular cholesteric liquid crystal compound which exhibits a cholesteric phase in a temperature higher than a room temperature, in which the low molecular cholesteric liquid crystal compound reflects light within a visible wavelength range according to the temperature, and is solidified while remaining in the reflective state by being cooled rapidly from the temperature, and a nematic liquid crystal compound.

As the nematic liquid crystal compound, generally used ones, for example, liquid crystal cyanobiphenyl compounds, liquid crystal phenylcyclohexyle compounds, liquid crystal ester compounds, liquid crystal tolan compounds, liquid crystal pyrimidine compounds, liquid crystal bicyclohexyle compounds, liquid crystal phenyldioxane compounds and mixtures of these compounds can be used. It is possible to add a chiral agent which has a substituent with asymmetric carbon to the nematic liquid crystal compound. As the low-molecular cholesteric liquid crystal compound, for example, 10, 12-dicholesteril docosadiindioic acid can be used.

BRIEF DESCRIPTION OF THE DRAWINGS

These and other objects and features of the present invention will be apparent from the following description with reference to the accompanying drawings, in which:

FIG. 1 is a graph which shows the infrared absorbing spectrum of a rewritable thermosensible material produced by the first embodiment of the production method according to the present invention;

FIG. 10 is a sectional view of a recording medium according to the tenth embodiment of the present invention;

FIG. 11 is a sectional view of a recording medium according to the eleventh embodiment of the present invention;

DETAILED DESCRIPTION OF THE PREFERRED EMBODIMENTS

Figure 2:
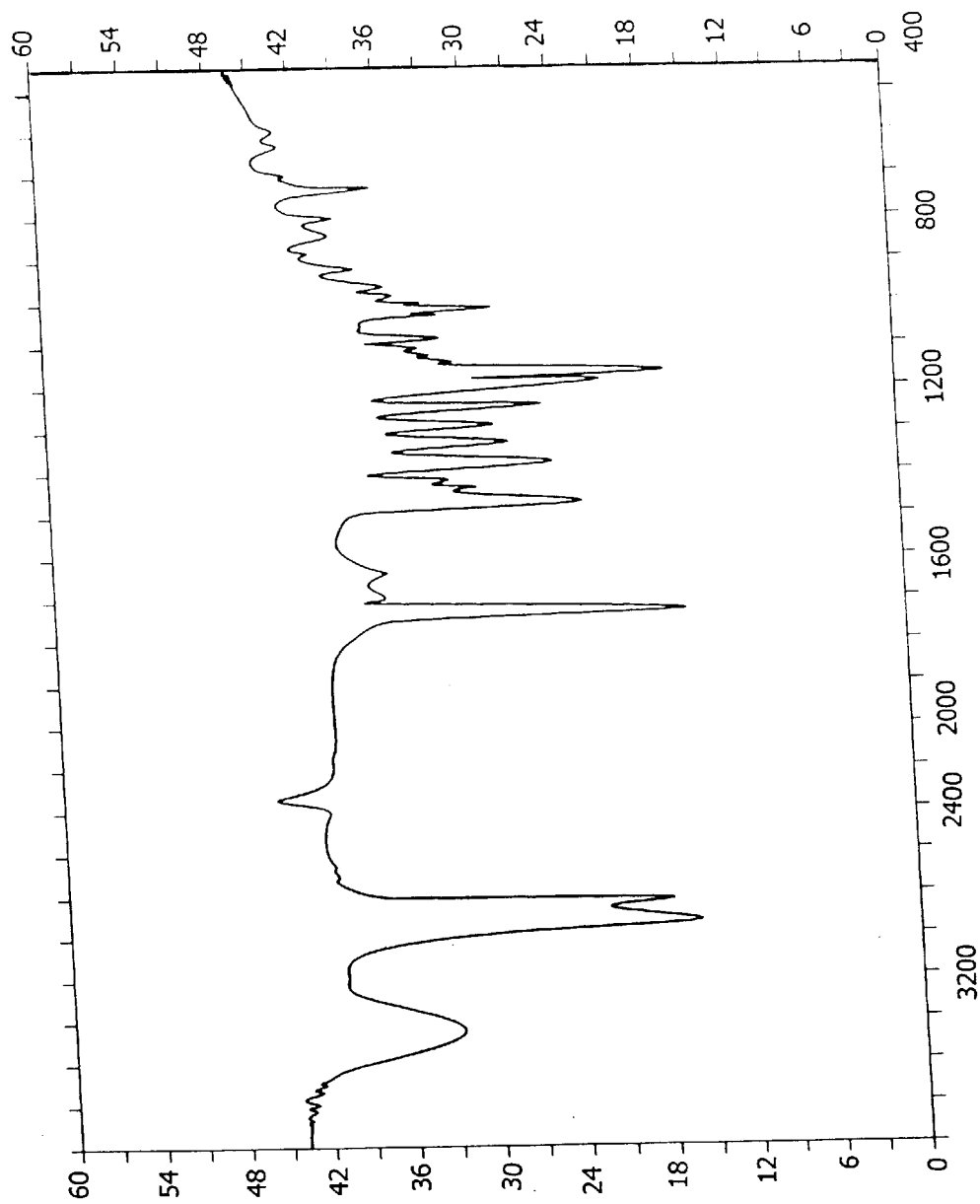
FIG. 2 is a graph which shows the infrared absorbing spectrum of a rewritable thermosensible material produced by the second embodiment of the production method according to the present invention.

Preferred embodiments of a rewritable thermosensible recording material, a production method thereof and a rewritable thermosensible recording medium according to the present invention are described with reference to the accompanying drawings. Although specific substances are named in the embodiments below, they are merely examples. The present invention is not limited to the ones using these substances, and various materials are usable.

First Embodiment of the Production Method

The first embodiment is a method of producing a rewritable thermosensible recording material of the chemical formula (A) in which n is 13.

First, in a 100 ml-flask connected to a water-cooled tube, 0.63 g (2.56 millimol) of tridecanedloic acid, 0.91 g (7.95 millimol) of thionyl chloride were dissolved in 20 ml of dioxane, and several drops of dimethyl formamide were dropped. Then, this solution was left in a temperature within a range from 70° C. to 80° C. for three hours to make the agents react to one another. The reactant was evaporated under reduced pressure, so that dichloride tridecanedioic acid was obtained. This dichloride was dissolved in 10 ml of dehydrated tetrahydrofuran, and 2 g (5.17 millimol) of cholesterol was dropped in a mixed solvent of 10 ml of hydrated tetrahydrofuran and 10 ml of pyridine while being stirred. It took 15 minutes for the dropping. Thereafter, the solution was stirred for one hour, and the obtained reactant was purged in 500 ml of iced water to be neutralized. The obtained crystal was separated by filtration and purified by recrystallization using ethyl acetate, and thus, 1.5 g of a target substance of white crystal was obtained. The yield was 59.8%.

The molecular formula of the resultant substance was $C_{67}H_{112}O_4$. According to calculation, the substance contained C at 82.04%, H at 11.43% and O at 6.53%. According to analysis, the substance contained C at 82.10%, H at 11.40% and O at 6.50%. The melting point was 150 to 151° C. The analysis was carried out by use of a CHN analyzing device. In the embodiments below, this device was used for analysis.

FIG. 1 shows the infrared absorbing spectrum of the rewritable thermosensible recording material which was produced by the above-described method.

Second Embodiment of the Production Method

The second embodiment is a method of producing a rewritable thermosensible recording material of the chemical formula (A) in which n is 16.

First, in a 100 ml-flask connected to a water-cooled tube, 0.73 g (2.56 millimol) of hexadecanedioic acid and 1.06 g (5.14 millimol) of dicyclohexyl carbodiimide were dissolved in 20 ml of dehydrated tetrahydrofuran, and this solution was mixed with a solution which had been made by dissolving 2 g (5.17 millimol) of cholesterol in a solvent which is a mixture of 20 ml of dehydrated tetrahydrofuran and several drops of 4-dimethylaminopyridine. Thereafter, this mixture was left in a room temperature for 12 hours for reaction. After the reaction, the reactant was left in a room temperature to be cooled and was purged in 500 ml of iced water to be neutralized. The obtained crystal was separated by filteration and purified by recrystalization using ethyl acetate, and 1.4 g of a target substance of white crystal was obtained. The yield was 53.8%.

The molecular formula of the resultant substance was $C_{70}H_{118}O_4$. According to calculation, the substance contained C at 82.68%, H at 11.02% and O at 6.30%. According to analysis, the substance contained C at 82.71%, H 11.01% and O at 6.28%. The melting point of the substance was 148 to 149° C.

FIG. 2 shows the infrared absorbing spectrum of the rewritable thermosensible recording material which was produced by the above-described method.

Third Embodiment of the Production Method

The third embodiment is a method of producing a rewritable thermosensible recording material of the general chemical formula (A) in which n is 18.

First, in a 100 ml-flask connected to a water-cooled tube, 0.88 g (2.56 millimol) of eicosanedioic acid and 2 g (5.17 millimol) of cholesterol were dissolved in 40 ml of hydrated tetrahydrofuran. In this solution, several drops of $H_2SO_4$/$H_3BO_3$ were dropped. Thereafter, this was left in a room temperature for ten hours for reaction. After the reaction, the reactant was left in a room temperature to be cooled and was purged in 500 ml of iced water to be neutralized. The obtained crystal was separated by filteration and purified by recrystallization using ethyl acetate. Thus, 1.5 g of a target substance of white crystal was obtained. The yield was 54.3%.

The molecular formula of the resultant substance was $C_{74}H_{126}O_4$. According to calculation, the substance contained C at 82.37%, H at 11.69% and O at 5.94%. According to analysis, the substance contained C at 82.40%, H at 11.67% and O at 5.93%. The melting point was 139 to 140° C.

Figure 3:
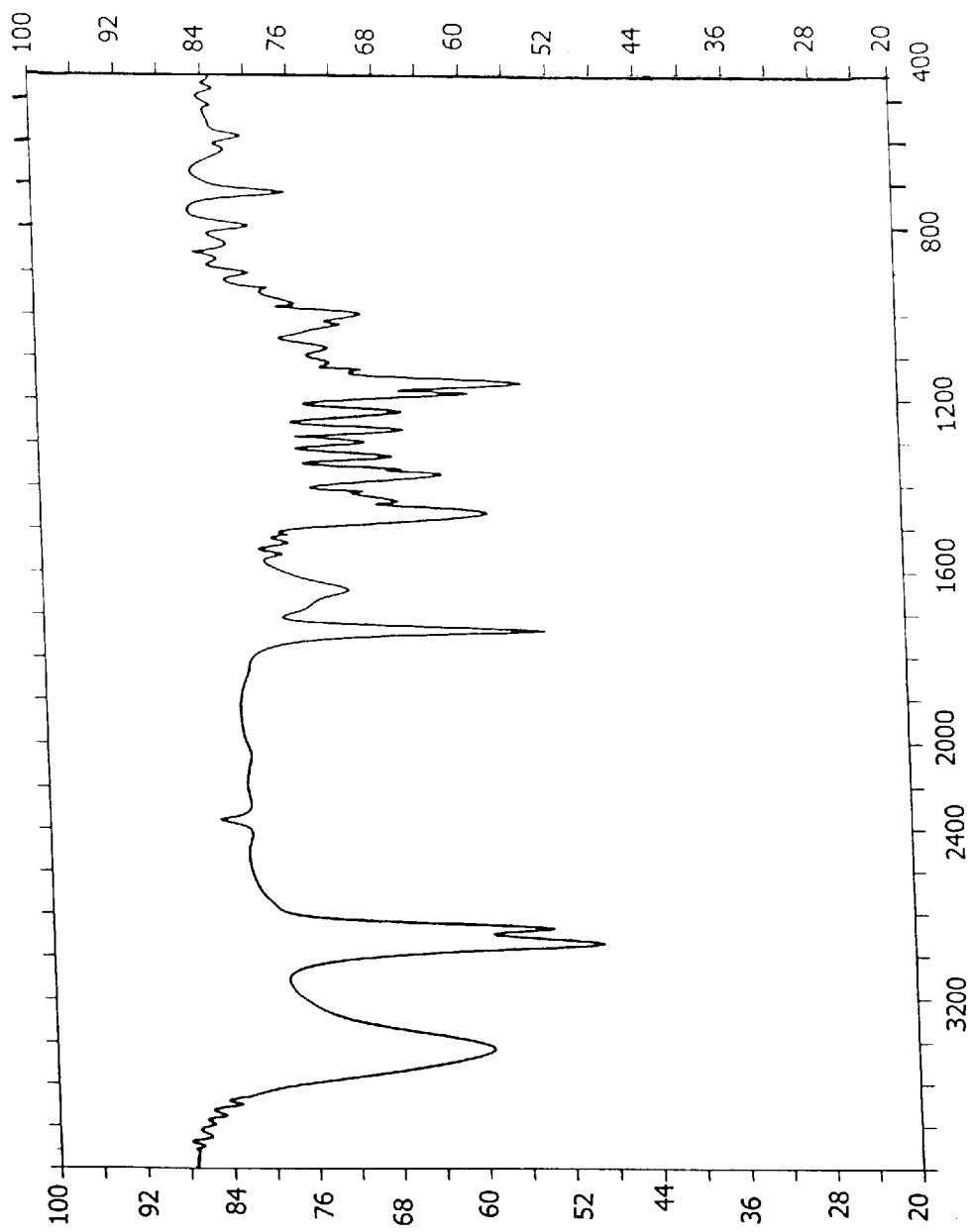
FIG. 3 is a graph which shows the infrared absorbing spectrum of a rewritable thermosensible material produced by the third embodiment of the production method according to the present invention.

FIG. 3 shows the infrared absorbing spectrum of the rewritable thermosensible recording material which was produced by the above-described method.

First Embodiment of the Recording Medium

A black polyether sulfone film was used as a base, and a small volume of rewritable thermosensible recording material of the chemical formula (A) in which n is 15 was placed on the base. The base with the material thereon was heated by a hot plate so that the material would melt. Then, a thin transparent polyether sulfone film was covered on the material, and this was cooled rapidly. A recording medium was produced in this way. Part of the recording medium was heated to 90° C. by use of a hot stamp. Then, when the recording medium was cooled rapidly, the heated part became green, and this display color was kept ever after. When the recording medium was partly heated to 120° C. by use of a hot stamp and thereafter was cooled rapidly, the heated part became blue, and this display color was kept ever after. Further, when the recording medium was heated to 140° C. and thereafter cooled rapidly, the display color disappeared, and the recording medium came back to the initial state.

Second Embodiment of the Recording Medium

A black polyether sulfone film was used as a base, and a small volume of rewritable thermosensible recording material of the chemical formula (A) in which n is 16 was placed on the base. The base with the material thereon was heated by a hot plate so that the material would melt. Then, a thin transparent polyether sulfone film was covered on the material, and this was cooled rapidly. A recording medium was produced in this way. Part of the recording medium was heated to 80° C. by use of a hot stamp. Then, when the recording medium was cooled rapidly, the heated part became yellow, and this display color was kept ever after. When the recording medium was partly heated to 115° C. by use of a hot stamp and thereafter was cooled rapidly, the heated part became blue, and this display color was kept ever after. Further, when the recording medium was heated to 140° C. and thereafter cooled rapidly, the display color disappeared, and the recording medium came back to the initial state.

Third Embodiment of the Recording Medium

Figure 4:
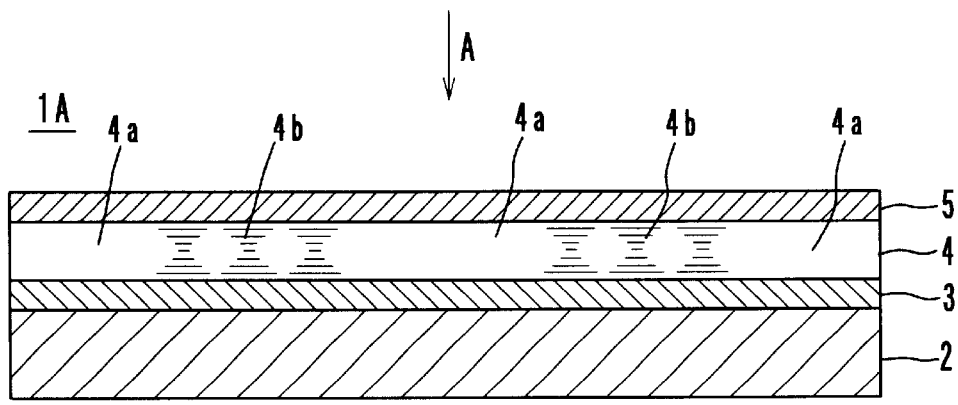
FIG. 4 is a sectional view of a recording medium according to the third, fourth, twelfth and thirteenth embodiments of the present invention.

See FIG. 4

Referring to FIG. 4, a rewritable thermosensible recording medium 1A comprises a base layer 2, an intermediate layer 3, a recording layer 4 and a protective layer 5. The base layer 2 is a sheet of flexible material such as paper, polycarbonate, PET (polyethylene terephthalate), and in this embodiment, a white PET film is used. The use of a flexible sheet as the base layer permits paper-like handling, e.g., bending and bounding of such recording media.

The intermediate layer 3 contains a component with a visible light absorbing function, and its surface abutting on the recording layer 4 is smooth. Specifically, carbon black was dispersed on silicone resin (YR3370 made by Toshiba Silicone), and this was mixed with an isopropyl alcohol solution with a catalyst (CR15 made by Toshiba Silicone) mixed therein. This solution was coated on the base layer 2 and was dried and thermally set to be made into an intermediate layer 3 with a thickness of 5 μm.

The recording layer 4 is a liquid crystal layer which contains at least two low molecular cholesteric liquid crystal compounds. Specifically, liquid crystal compounds shown by the following chemical formulas ($D_1$) and ($E_1$) were mixed and dissolved in tetrahydrofuran at a ratio by weight of 10:10:100. This solution was coated on the intermediate layer 3 by a blade and was heated and dried to be made into a rewritable thermosensible recording layer 4 with a thickness of 10 μm. The thickness of the recording layer 4 is desirably within a range from 1 μm to 50 μm, and more desirably within a range from 2 μm to 30 μm. If the recording layer is too thick, large energy is required for writing, thereby increasing the cost, although the contrast is high. If the recording layer is too thin, the contrast is low, and quality images cannot be obtained.

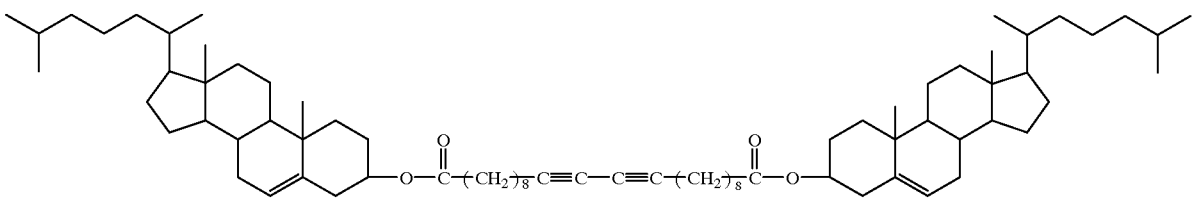

(D₁)

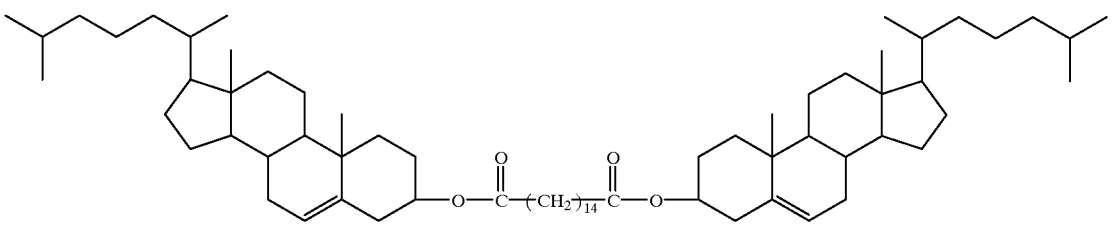

(E₁)

The compound of the chemical formula (E₁) can be produced, for example, by making cholesterol and halide dicarboxylic acid or a derivative of dicarboxylic acid react to each other in the presence of a suitable catalyst.

The protective layer 5 is made of resin. Specifically, a polyester film with a thickness of 3 μm was laid on the recording layer 4, and the polyester film and the recording layer 4 were heated to 100° C. to adhere to each other. Then, the peripheral sides were sealed by an adhesive (Alonalfar made by Toa Gosei Co., Ltd.).

The recording medium 1A composed of the above materials is once heated until it becomes isotropic, and the temperature is regulated to one within a range from 55° C. to 120° C. and thereafter dropped rapidly. Thereby, the liquid crystal exhibits a cholesteric phase, in which the helical axis is perpendicular to the intermediate layer 3, and reflects light with a specified wavelength according to the regulated temperature. When the temperature is regulated to approximately 60° C., the liquid crystal shows red; when the temperature is regulated to approximately 75° C., the liquid crystal shows green; and when the temperature is regulated to approximately 100° C., the liquid crystal shows blue. When the recording medium 1A is cooled rapidly from these temperatures, the liquid crystal is solidified while remaining in the reflective state.

Further, when the liquid crystal is heated to a temperature over approximately 120° C. and thereafter cooled rapidly, the liquid crystal becomes transparent. When the recording medium 1A is heated to a temperature over 120° C. by use of a hot plate or the like and thereafter cooled rapidly, the whole surface of the recording layer 4 becomes transparent. In this state, to an observer viewing from the direction of arrow "A", a black display can be seen because visible light is absorbed in the intermediate layer 3.

When the recording medium 1A is partly heated and cooled rapidly by use of a known thermal head, the heated part shows a color according to the temperature at which the rapid cooling started. In FIG. 4, the reference number 4a indicates a part in a transparent state, and the reference number 4b indicates a part left in a cholesteric phase. When writing is carried out at 75° C. by use of a thermal head, a green-on-black display can be seen to an observer viewing from the direction of arrow "A". By carrying out writing at 60° C., 75° C. and 110° C. selectively for R (red), G (green) and B (blue), full-color display is possible. According to the third embodiment, a low-reflectance part can be realized by mixing minuscule black portions in that part.

In the recording medium 1A, a display color of the liquid crystal is seen on a black background. When a coloring agent which reflects light within a specified wavelength range is added to the intermediate layer 3, a display color of the liquid crystal can be seen on a background of a color determined by the coloring agent. A white background can be realized by arranging minuscule portions of blue, green and red in areas with no image information in mosaic, whereby the areas can be seen as white macroscopically.

According to the third embodiment, the melting point of the base layer 2 is not lower than 200° C.; the melting point of the intermediate layer 3 is not lower than 200° C.; the crystallization point of the protective layer 5 is not lower than 200° C.; and the melting point of the recording layer 4 is 120° C. Even when the recording layer 4 is liquefied by being heated to 120° C. or higher at the time of writing or erasing, as long as the base layer 2, the intermediate layer 3 and the protective layer 5 are kept at a temperature not higher than the melting points thereof, the mechanical strength of the layers 2, 3 and 4 can be maintained, and the thickness of the recording layer 4 can be maintained against the pressure exerted by the thermal head. If spherical spacers are mixed in the recording layer 4, the thickness of the recording layer 4 can be maintained more positively.

In the third embodiment, carbon black is added to the intermediate layer 3 so that the intermediate layer 3 can obtain a function of absorbing light within the whole visible light wavelength range. For example, if a function of reflecting blue is imparted to the intermediate layer 3 and if writing is carried out in such a way that the recording layer 4 will reflect yellow, a display in blue and white can be made. Of course, by adopting this method, a multi-color display becomes possible. In this method, the white reflection amount is the sum of the blue reflection amount of the intermediate layer 3 and the yellow reflection amount of the recording layer 4. The resultant reflection amount is greater than the white reflection amount in a case of displaying white by arranging the three primary colors of blue, green and red in mosaic, and thus, a brighter display can be obtained. Also, a more colorful display becomes possible by making the intermediate layer 3 reflect light of a plurality of colors.

In the third embodiment, the display color changed within a temperature range from 55° C. to 120° C., and the reflected light was of a wavelength range from 680 nm to 400 nm. When printing was carried out on the recording medium according to the third embodiment by use of a hot stamp, color variations in a wide range was possible, and the recording medium attained high recording performance.

Thermal Printer

Figure 16:
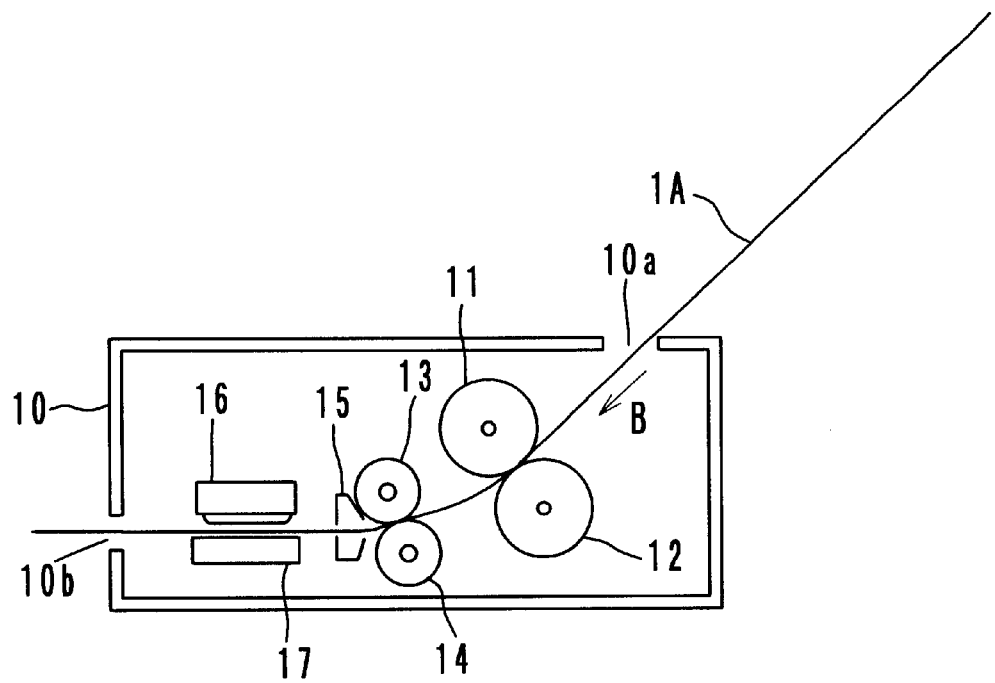
FIG. 16 is a schematic structural view of a thermal printer.
Figure 17:
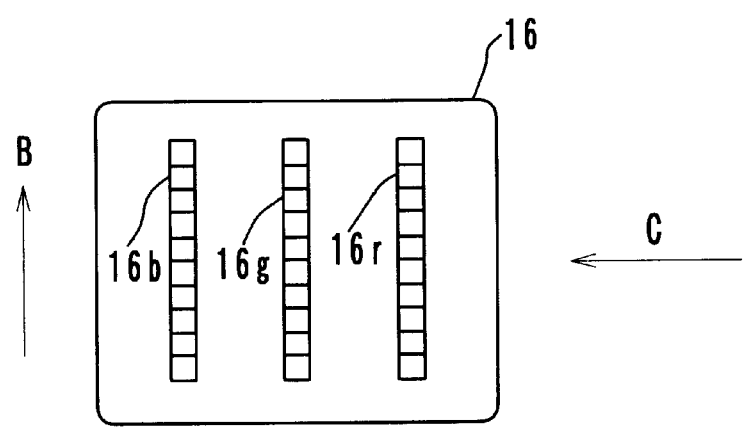
FIG. 17 is a plan view of a thermal head of the thermal printer.

See FIGS. 16 and 17

FIG. 16 shows a thermal printer for writing information in the recording medium 1A. This printer has conveyer rollers 11 and 12, heat rollers 13 and 14, a cooler 15, a thermal head 16 and a platen 17 which are arranged in a housing 10 in this order along a direction "B" in which the recording medium 1A travels.

The recording medium 1A enters the printer by way of an entrance 10a, is sent from the conveyer rollers 11 and 12 to the heat rollers 13 and 14, where it is heated to 120° C. or higher. Thereafter, it is rapidly cooled by the cooler 15. In this way, the information which has been recorded in the recording medium 1A is erased. Next, the recording medium 1A is fed between the platen 17 and the thermal head 16 where required information is written therein. After the recording medium 1A is heated by the thermal head 16 to come to a display state, natuarally, it is cooled rapidly. Thereby, the written information is fixed in the recording medium 1A, and the recording medium 1A is discharged by way of an outlet 10b.

Since the recording medium 1A is rapidly cooled naturally after passing by a heating member of the thermal head 16, cooling means is essentially unnecessary. For more positive cooling operation, however, the cooler 15 is provided as shown in FIG. 16, or another cooler can be arranged downstream of the thermal head 16.

The thermal head 16, as shown in FIG. 17, has three heating members 16r, 16g and 16b juxtaposed in a direction "C" at a right angle to the recording medium traveling direction "B". The heating member 16r is for writing red; the heating member 16g is for writing green; and the heating member 16b is for writing blue. Each of the heating members 16r, 16g and 16b has a multiplicity of pixel components aligned in the direction "B".

The thermal head 16 is so constructed to reciprocate in the direction "C" at a right angle to the recording medium traveling direction "B" in synchronism with the motion of the recording medium 1A. The heating members are turned on and off in accordance with image information of the respective colors while moving in the direction "C". By repeating the heating and non-heating in this way, an image is written in the recording medium 1A as many lines as the pixel components arranged in a line at a time, thereby finally reproducing a full-color image on the recording medium 1A. The writing operation is performed by the heating members preferably in the descending order of temperature, i.e. by the blue heating member 16b, the green heating member 16g and the red heating member 16r in this order. It is possible to write the three colors with a single heating member; this, however, requires complicated temperature control. Therefore, it is preferred to write the three colors with different heating members.

Laser Printer

Figure 18:
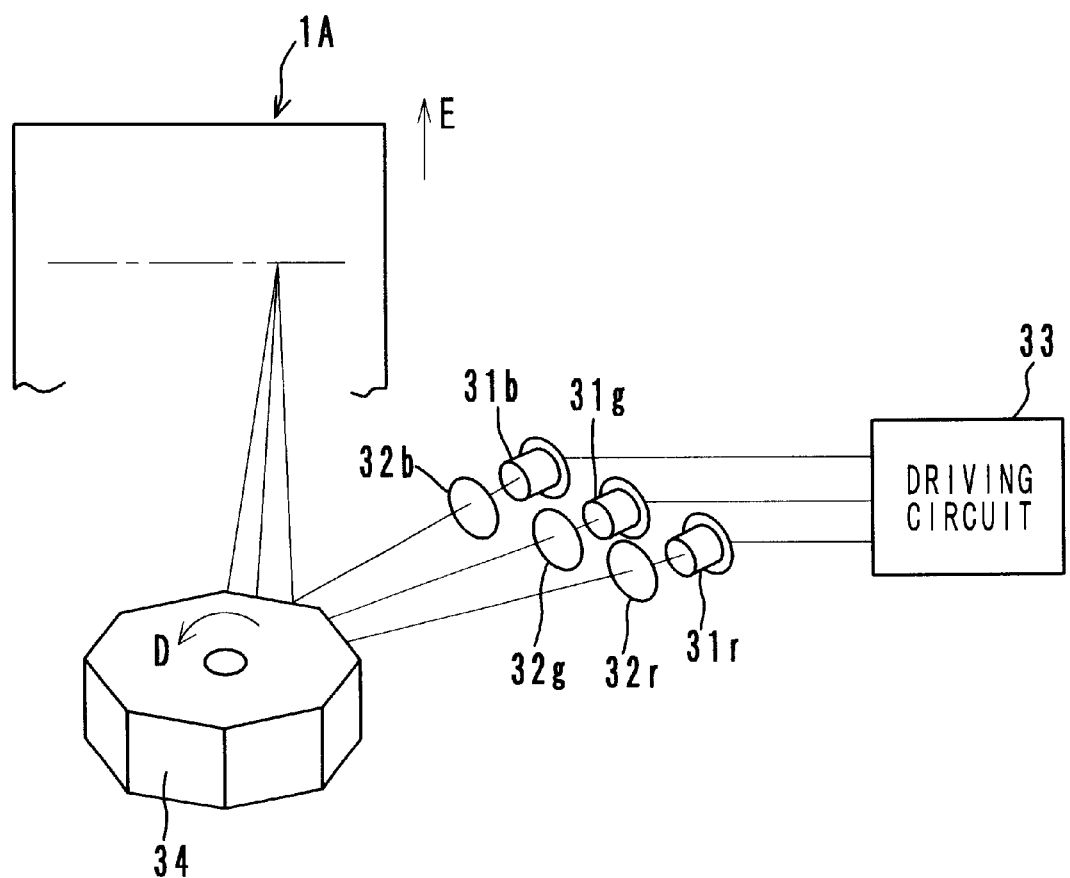
FIG. 18 is a schematic perspective view of a laser printer.

See FIG. 18

Writing of information in the recording medium 1A can be carried out by use of a laser printer shown by FIG. 18. In the case of using a laser printer for writing, it is preferred to disperse an infrared ray absorbent in the intermediate layer 3 or the protective layer 5 or alternatively to construct the intermediate layer 3 or the protective layer 5 from an infrared ray absorbing material for conversion of the energy of the laser beam into heat. Also, if the recording medium does not have the intermediate layer 3, the baser layer 2 contains or is constructed from an infrared ray absorbing material.

In the laser printer, laser sources 31b, 31g and 31r for writing blue, green and red, respectively, which are semiconductor lasers, carbon oxide gas lasers, YAG lasers or the like, are modulated by a driving circuit 33, and laser beams emitted from the respective lasers are incident to a polygon mirror 34 via collimator lenses 32b, 32g and 32r. The polygon mirror 34 is driven to rotate in a direction of arrow "D", and with the rotation, the laser beams are deflected, resulting in linear scanning of the laser beams on the recording medium 1A. Meanwhile, the recording medium 1A is fed in the direction of arrow "E", and thus, a two-dimensional full-color image is written. Further, the laser printer comprises optical elements such as an f θ lens, etc. although they are not shown in the drawings.

The color to be written is regulated by controlling the radiation energy of the laser sources 31b, 31g and 31r. Therefore, it is possible to use a single semiconductor laser to write respective colors by controlling the energy of the laser beam. In the case of writing colors by use of three laser sources, however, the energy control is easier.

Fourth Embodiment of the Recording Medium

A recording medium of the fourth embodiment is of the same structure as the recording medium 1A shown by FIG. 4. The base layer 2, the intermediate layer 3 and the protective layer 5 are made of the materials described in the third embodiment of the recording medium. The recording layer 4 was produced as follows: the liquid crystal compound of the chemical formula ($D_1$) and the liquid crystal compound of the chemical formula ($E_1$) were dissolved in tetrahydrofuran at a ratio by weight of 3:7:100; this solution was coated on the intermediate layer 3 by a blade and was heated and dried to be made into a rewritable thermosensible recording layer 4 with a thickness of 10 μm. The thickness of the recording layer 4 is desirably within a range from 1 μm to 50 μm, and more desirably within a range from 3 μm to 30 μm.

In the fourth embodiment, the display color changed within a temperature range from 60° C. to 120° C., and the reflected light was of a wavelength range from 670 nm to 410 nm. When printing was carried out on the recording medium of the fourth embodiment by use of a thermal head, color variations in a wide range were possible, and the recording medium attained high recording performance. Needless to say, the recording medium is capable of being subjected to image writing and image erasing by use of the thermal printer and the laser printer described above.

Fifth Embodiment of the Recording Medium

Figure 5:
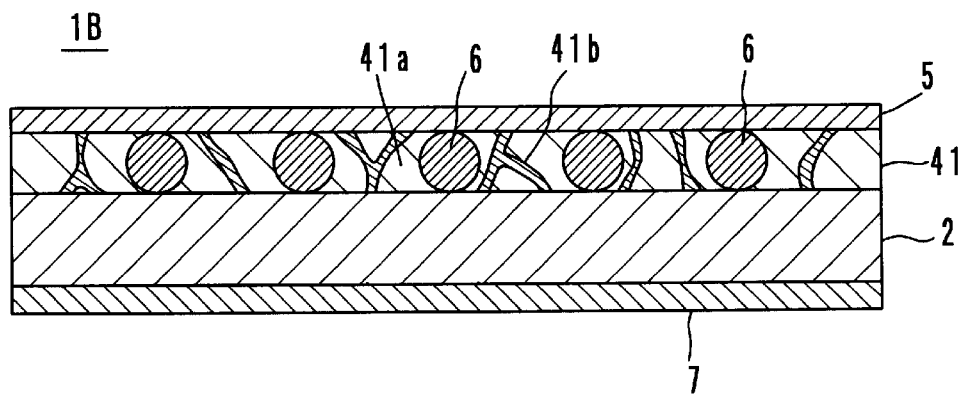
FIG. 5 is a sectional view of a recording medium according to the fifth and fourteenth embodiments of the present invention.

See FIG. 5

Referring to FIG. 5, a rewritable thermosensible recording medium 1B comprises a base layer 2, a recording layer 41, a protective layer 5 and a light absorbing layer 7 which is provided on the reverse side of the base layer 2. The recording layer 41 is a composite of at least two low molecular cholesteric liquid crystal compounds and polymeric resin. The recording layer 41 is separated into liquid crystal sections 41a by a resin layer 41b. Further, spherical spacers 6 of resin, inorganic oxide or the like are mixed in the recording layer 41.

According to the fifth embodiment, in which the recording layer 41 is a polymeric composite layer, the mechanical strength of the recording layer 41 is so high that the damage under external force such as bend and friction can be minimized. Also, even when the recording layer 41 is heated to a temperature at which the low molecular cholesteric compounds come to an isotropic phase, the recording layer 41 is not deteriorated.

Next, the materials and the production method are described referring to a specific example.

Silica spacers 6 with an average particle diameter of 15 μm were dispersed in ethanol and sprayed on a transparent PES (polyether sulfone) film. Next, the cholesteric liquid crystal compounds of the chemical formulas ($D_1$) and ($E_1$) were mixed with each other at a ratio by weight of 1:3. The mixture and bifunctional acrylate R712 (made by Nippon Kayaku Co., Ltd.), which has an aromatic ring, containing a photopolymerization initiator DAROCUR1173 (made by Chiba-Geigy (Japan)) at 3 wt % were mixed with each other at a ratio by weight of 8:2. Thus, a liquid crystal composition was prepared. This liquid crystal composition was coated on the base layer 2, and a transparent polyether sulfon film with a thickness of 2 μm was laid thereon as a protective layer 5.

Next, while the protective layer 5 was pressed, ultraviolet rays of 0.002 mW/cm² were radiated for one hour, and further, ultraviolet rays of 0.25 mW/cm² were radiated for one hour. Thus, a composite layer (recording layer 41) with a thickness of 15 μm was formed. Further, black paint was coated on the reverse side of the base layer 2 to form a light absorbing layer 7.

In the fifth embodiment, the display color changed within a temperature range from 60° C. to 120° C., and the reflected light was of a wavelength range from 660 nm to 420 nm. When printing was carried out on the recording medium of the fifth embodiment by use of a thermal head, color variations in a wide range were possible, and the recording medium attained high recording performance. Needless to say; the recording medium is capable of being subjected to image writing and image erasing by use of the thermal printer and the laser printer described above.

Figure 6:
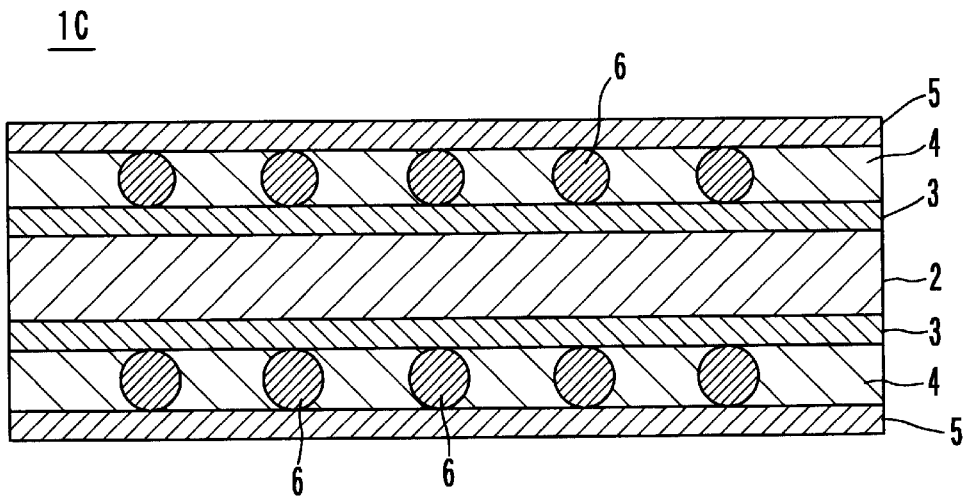
FIG. 6 is a sectional view of a recording medium according to the sixth and fifteenth embodiments of the present invention.

Sixth Embodiment of the Recording Medium
See FIG. 6

FIG. 6 shows a rewritable thermosensible recording medium 1C according to the sixth embodiment. This recording medium 1C has an intermediate layer 3, a recording layer 4 and a protective layer 5 on each of the front side and the back side of a base layer 2, so that information can be written on both sides of the recording medium 1C.

Specifically, on both sides of a transparent PET (polyethylene terephthalate) film with a thickness of 200 μm, aluminum layers with a thickness of approximately 60 nm were formed as the intermediate layers 3 which reflect light. Next, silica spacers 6 with an average particle diameter of 8 μm the liquid crystal compound of the chemical formula ($D_1$) and the liquid crystal compound of the chemical formula ($E_2$) were mixed and dissolved in toluene. The mixing ratio by weight of the liquid crystal compound of the chemical formula ($D_1$), the liquid crystal compound of the chemical formula ($E_2$) and the toluene was 5:5:100. This solution was coated on the intermediate layers 3 by a blade and was heated and dried to be made into rewritable thermosensible recording layers 4 with a thickness of 8 μm. Further, on the recording layers 4, polyester films with a thickness of 1 μm were laid, and these were heated to 100° C. to adhere to one another.

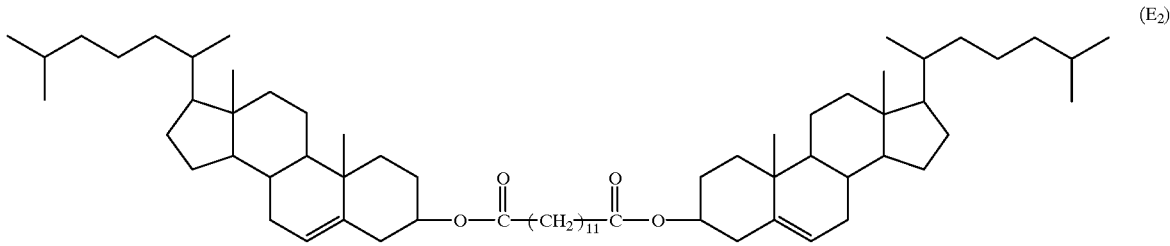

($E_2$)

In the sixth embodiment, the display color changed within a temperature range from 35° C. to 105° C., and the reflected light was of a wavelength range from 700 nm to 390 nm. When printing was carried out on the recording medium of the sixth embodiment by use of a thermal head, color variations in a wide range were possible, and the recording medium attained high recording performance. Needless to say, the recording medium is capable of being subjected to image writing and image erasing by use of the thermal printer and the laser printer described above.

Figure 7:
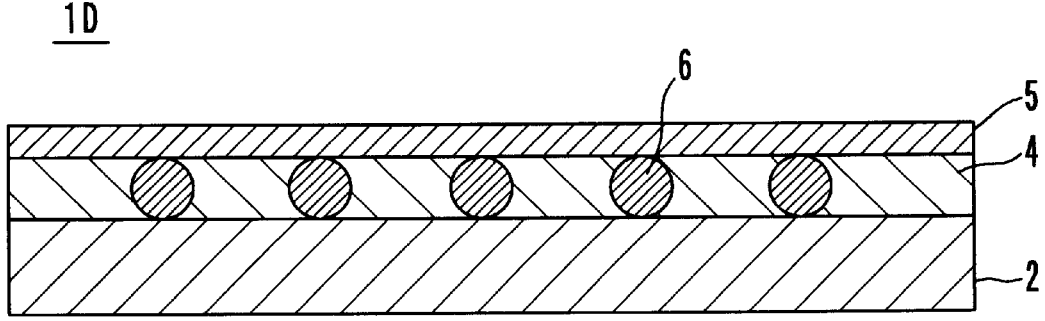
FIG. 7 is a sectional view of a recording medium according to the seventh embodiment of the present invention.

Seventh Embodiment of the Recording Medium
See FIG. 7

Referring to FIG. 7, a rewritable thermosensible recording medium 1D according to the seventh embodiment comprises a base layer 2, a recording layer 4 and a protective layer 5. The base layer 2 is a black sheet of flexible material such as PET (polyethylene terephthalate). The use of a material with a light absorbing function as the base layer 2 permits clear color display of the recording medium. Also, the use of flexible material as the base layers 2 permits paper-like handling, e.g., bending and binding of such recording media.

The recording layer 4 is a liquid crystal layer containing at least two low molecular cholesteric liquid crystal compounds. Specifically, silica spacers with an average particle diameter of 6 μm, the liquid crystal compound of the chemical formula ($D_1$) and a liquid crystal compound shown by the following chemical formula ($J_1$) were mixed and dissolved in tetrahydrofuran. The mixing ratio by weight of the liquid crystal compound of the chemical formula ($D_1$), the liquid crystal compound of the chemical formula ($J_1$) and tetrahydrofuran was 5:5:100. This solution was coated on the intermediate layer 3 by a blade and was heated and dried to be made into a rewritable thermosensible recording layer 4 with a thickness of 6 µm. Further, on the recording layer 4, a polyester film with a thickness of 1 µm was laid, and these are heated to 100° C. to adhere to each other.

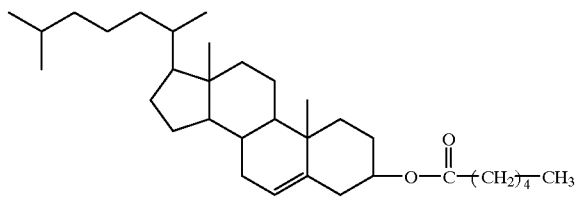

(J₁)

The compound of the chemical formula (J₁) can be produced, for example, by making cholesterol and an alkyl carboxylic compound react to each other in the presence of a suitable catalyst.

In the seventh embodiment, the display color changed within a temperature range from 30° C. to 88° C., and the reflected light was of a wavelength range from 570 nm to 400 nm. When printing was carried out on the recording medium of the seventh embodiment by use of a thermal head, color variations in a wide range were possible, and the recording medium attained high recording performance. Needless to say, the recording medium is capable of being subjected to image writing and image erasing by use of the thermal printer and the laser printer described above.

Figure 8:
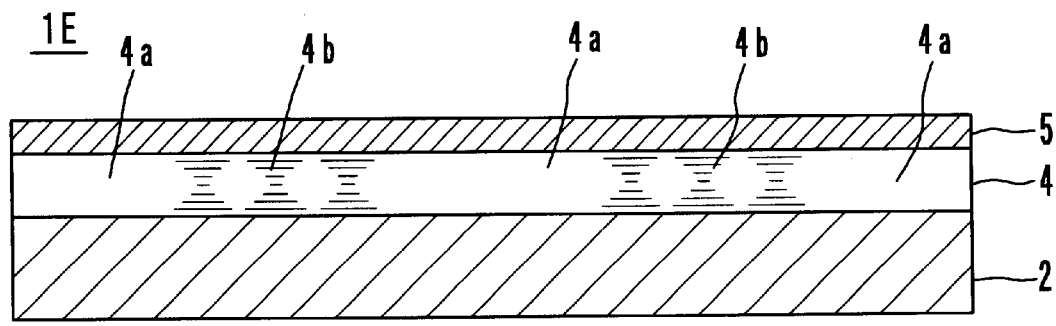
FIG. 8 is a sectional view of a recording medium according to the eighth embodiment of the present invention.

Eighth Embodiment of the Recording Medium
See FIG. 8

Referring to FIG. 8, a rewritable thermosensible recording medium 1E according to the eighth embodiment comprises a base layer 2, a recording layer 4 and a protective layer 5. As the base layer 2, as in the seventh embodiment, black PET was used.

The recording layer 4 is a liquid crystal layer which contains at least two low molecular cholesteric liquid crystal compounds. Specifically, the liquid crystal compound of the chemical formula (D₁) and a liquid crystal compound shown by the following chemical formula (I₁) were mixed and dissolved in tetrahydrofuran at a ratio by weight of 10:10:100. This solution was coated on the intermediate layer 3 by a blade and was heated and dried to be made into a rewritable thermosensible recording layer 4 with a thickness of 5 µm. The thickness of the recording layer 4 is desirably within a range from 1 µm to 50 µm, and more desirably within a range from 2 µm to 30 µm.

The protective layer 5 is made of resin. Specifically, a polyester film with a thickness of 2 µm is laid on the recording layer 4, and these were heated to 100° C. to adhere to each other. Then, the peripheral sides were sealed by an adhesive (Alonalfar made by Toa Gosei Co., Ltd.).

In the eighth embodiment, the display color changed within a temperature range from 30° C. to 105° C., and the reflected light was of a wavelength range from 685 nm to 390 nm. When printing was carried out on the recording medium of the eighth embodiment by use of a thermal head, color variations in a wide range were possible, and the recording medium attained high recording performance. Needless to say, the recording medium is capable of being subjected to image writing and image erasing by use of the thermal printer and the laser printer described above.

Figure 9:
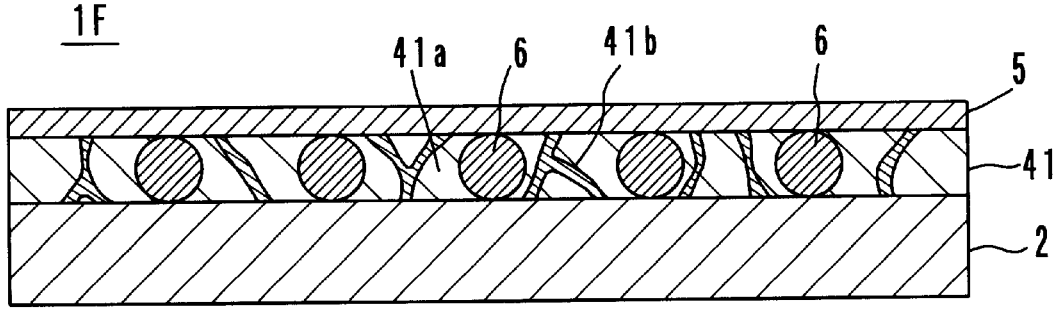
FIG. 9 is a sectional view of a recording medium according to the ninth embodiment of the present invention.

Ninth Embodiment of the Recording Medium
See FIG. 9

Referring to FIG. 9, a rewritable thermosensible recording medium 1F according to the ninth embodiment comprises a base layer 2, a recording layer 41 and a protective layer 5. The base layer 2 is a black sheet of flexible material such as PET (polyethylene terephthalate). The use of a material with a light absorbing function as the base layer 2 permits clear color display of the recording medium. Also, the use of flexible material as the base layer 2 permits paper-like handling, e.g., bending and binding of such recording media. The recording layer 41 is a polymeric composite layer, and hence, the mechanical strength of the recording layer 41 is so high that the damage due to external force such as bending, friction, etc. can be minimized. Also, even when the recording layer 41 is heated to a temperature at which the low molecular cholesteric liquid crystal compounds contained therein come to an isotropic phase, the recording layer 41 is not deteriorated.

The recording layer 41 is a liquid crystal layer which contains at least two low cholesteric liquid crystal compounds. Specifically, resin spacers 6 with an average particle diameter of 12 µm, the liquid crystal compound of the chemical formula (I₁), a liquid crystal compound shown by the following chemical formula (E₃) and tetrahydrofuran were mixed with each other. The mixing ratio by weight of the liquid crystal compound of the chemical formula (I₁), the liquid crystal compound of the chemical formula (E₃) and tetrahydrofuran was 5:5:50. Further, this mixture and bifunctional acrylate R712 (made by Nippon Kayaku Co., Ltd.), which has an aromatic ring, containing a photopolymerization initiator DAROCUR1173 (made by Chiba-Geigy (Japan)) at 3 wt % were mixed with each other at a ratio by

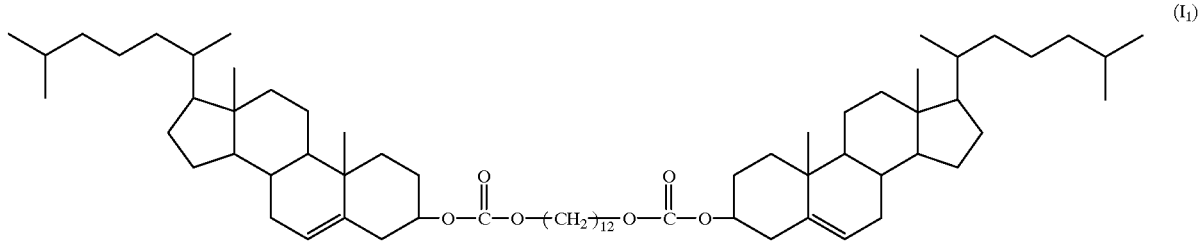

(I₁)

The compound of the chemical formula (I₁) can be produced, for example, by making a cholesteryl chloroformate compound and an alkylene glycol compound react to each other in the presence of a suitable catalyst.

weight of 8:2. Thus, a liquid crystal composition was prepared. This liquid crystal composition was coated on the base layer 2 and dried, and a polyeter sulfone film with a thickness of 2 µm was laid thereon as the protective layer 5.

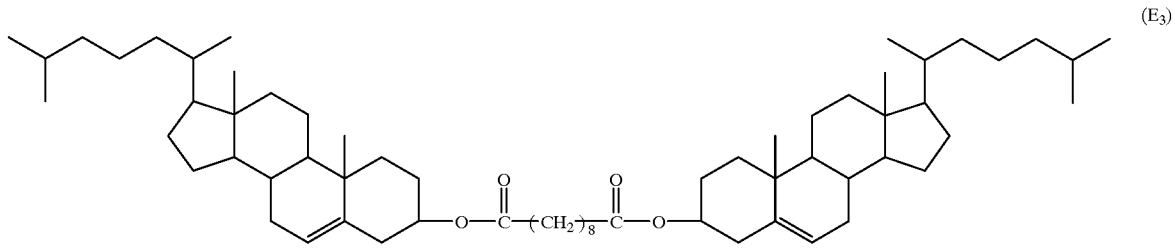

(E3)

The compound of the chemical formula (E₃) can be produced, for example, by making cholesterol and halide dicarboxylic acid or a derivative of dicarboxylic acid react to each other in the presence of a suitable catalyst.

Next, while the protective layer 5 was pressed, ultraviolet rays of 0.002 mW/cm² were radiated for one hour, and further, ultraviolet rays of 0.25 mW/cm² were radiated for one hour. Thus, a composite layer (recording layer 41) with a thickness of 12 μm was formed.

In the ninth embodiment, the display color changed within a temperature range from 30° C. to 125° C., and the reflected light was of a wavelength range from 655 nm to 400 nm. When printing was carried out on the recording medium of the ninth embodiment by use of a thermal head, color variations in a wide range were possible, and the recording medium attained high recording performance. Needless to say, the recording medium is capable of being subjected to image writing and image erasing by use of the thermal printer and the laser printer described above.

Tenth Embodiment of the Recording Medium
See FIG. 10

Referring to FIG. 10, a rewritable thermosensible recording medium 1G according to the tenth embodiment comprises a base layer 2, a recording layer 41 and a protective layer 5. The base layer 2 is a black sheet of flexible material such as PET (polyethylene terephthalate). The use of a material with a light absorbing function as the base layer 2 permits clear color display of the recording medium. Also, the use of flexible material as the base layer 2 permits paper-like handling, e.g., bending and binding of such recording media.

The recording layer 41 is a liquid crystal layer which contains at least two low molecular cholesteric liquid crystal compounds. Specifically, the liquid crystal compound of the chemical formulas (D₁) and a liquid crystal compound shown by the following chemical formula (G₁) and tetrahydrofuran were mixed with each other at a ratio by weight of 5:5:50. This mixture and bifunctional acrylate HDDA (made by Nippon Kayaku Co., Ltd.), which has an aromatic ring, containing a photopolymerization initiator DAROCUR1173 (made by Chiba-Geigy (Japan)) at 3 wt % were mixed with each other at a ratio by weight of 8:2. Thus, a liquid crystal composition was prepared. This liquid crystal composition was coated on the base layer 2 and dried, and a transparent polyether sulfon film with a thickness of 2 μm was laid thereon as a protective layer 5.

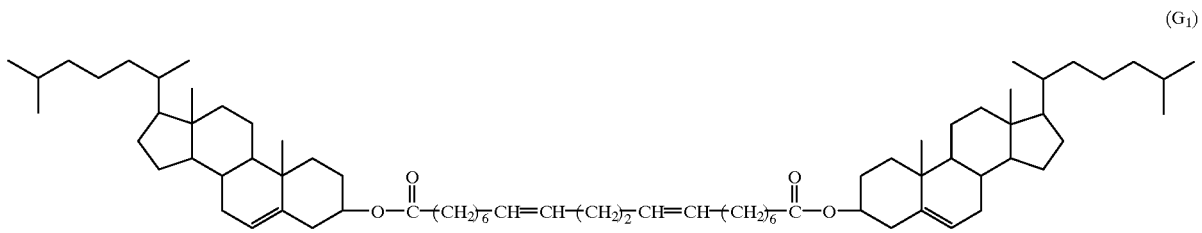

(G₁)

The compound of the chemical formula (G₁) can be produced, for example, by making cholesterol and halide dicarboxylic acid or a derivative of dicarboxylic acid react to each other in the presence of a suitable catalyst.

Next, ultraviolet rays of 13 mW/cm² were radiated for five minutes, and thus, a composite layer (recording layer 41) with a thickness of 8 μm was formed.

In the tenth embodiment, the display color changed within a temperature range from 35° C. to 120° C., and the reflected light was of a wavelength range from 690 nm to 380 nm. When printing was carried out on the recording medium of the tenth embodiment by use of a thermal head, color variations in a wide range were possible, and the recording medium attained high recording performance. Needless to say, the recording medium is capable of being subjected to image writing and image erasing by use of the thermal printer and the laser printer described above.

Eleventh Embodiment of the Recording Medium
See FIG. 11

Referring to FIG. 11, a rewritable thermosensible recording medium 1H comprises a base layer 2 and a recording layer 41. The base layer 2 is a black sheet of flexible material such as PET (polyethylene terephthalate). The use of a material with a light absorbing function as the base layer 2 permits clear color display of the recording medium. Also, the use of flexible material as the base layer 2 permits paper-like handling, e.g., bending and binding of such recording media. In the eleventh embodiment, the recording layer 41 is a composite of liquid crystal and polymeric resin, and a resin layer 41b formed on the upper surface of the recording layer 41 also serves as a protective layer.

The recording layer 41 contains at least two low molecular cholesteric liquid crystal compounds. Specifically, the liquid crystal compound of the chemical formula (D₁), a liquid crystal compound shown by the following chemical formula ($F_1$) and tetrahydrofuran were mixed together at a ratio by weight of 5:5:50. This mixture and thermosetting acrylic resin Acrydic A405 (made by Dainippon Ink & Chemicals, Inc.) containing melamine resin Superbeckamine (made by Dainippon Ink & Chemicals, Inc.) at 20 wt % were mixed with each other at a ratio by weight of 6:4. Thus, a liquid crystal composition was prepared. This liquid crystal composition was coated on the base layer 2, and was dried and thermally set to be made into a rewritable thermosensible recording layer 41 with a thickness of 15 μm.

example 1, the dependency of the reflected color to the cooling temperature was measured. The results were shown by FIGS. 12 and 13. The measurement was carried out as follows: each of the recording media was placed on a hot stage, and the temperature was raised to 150° C. so that the liquid crystal compound(s) would melt; thereafter, the temperature was dropped by 5° C. at a time while each temperature was kept for two minutes; and in the meantime, while light is radiated from the position at a right angle to the recording medium (from right above of the recording medium), the reflectance spectrum was measured by a

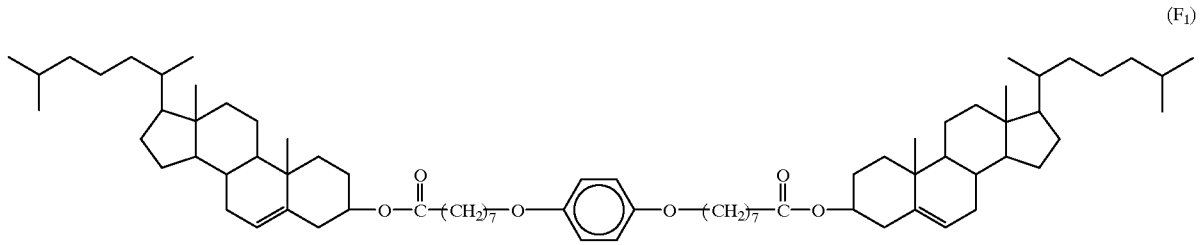

($F_1$)

The compound of the chemical formula ($F_1$) can be produced, for example, by making cholesterol and halide dicarboxylic acid and a derivative of dicarboxylic acid react to each other in the presence of a suitable catalyst.

In the eleventh embodiment, the display color changed within a temperature range from 50° C. to 135° C., and the reflected light was of a wavelength range from 690 nm to 440 nm. When printing was carried out on the recording medium of the tenth embodiment by use of a thermal head, color variations in a wide range were possible, and the recording medium attained high recording performance. Needless to say, the recording medium is capable of being subjected to image writing and image erasing by use of the thermal printer and the laser printer described above.

Comparative Example 1

The comparative example 1 is a recording medium of the same structure as the recording medium 1A shown by FIG. 4. The base layer 2 and the intermediate layer 3 of the comparative example 1 are made of the same materials of those of the third embodiment (the recording medium 1A). In the comparative example 1, the recording layer 4 was formed as follows: the liquid crystal compound of the chemical formula ($D_1$) was mixed and dissolved in tetrahydrofuran at a ratio by weight of 10:100; and this solution was coated on the intermediate layer 3 by a blade and was heated and dried to be made into a rewritable thermosensible recording layer 41 with a thickness of 10 μm. The protective layer 5 of the comparative example 1 was formed of the same material and in the same way as described in the third embodiment.

In the comparative example 1, the display color changed within a temperature range from 75° C. to 110° C., and the reflected light was of a wavelength range from 550 nm to 400 nm. When printing was carried out on the recording medium of the comparative example 1 by use of a thermal head, the temperature control was difficult because the variable range of reflected color and the range of temperature which permitted the variation of reflected color were narrow, and chromatic unevenness occurred.

Dependency of Reflected Color to Cooling Temperature

With respect to the recording media according to the third through eleventh embodiments and the comparative spectrocolorimeter (instant multi-photometry system: MCPD-2000 made by Otsuka Electrons Co., Ltd.) located in a position at an angle of 70°.

Figure 12:
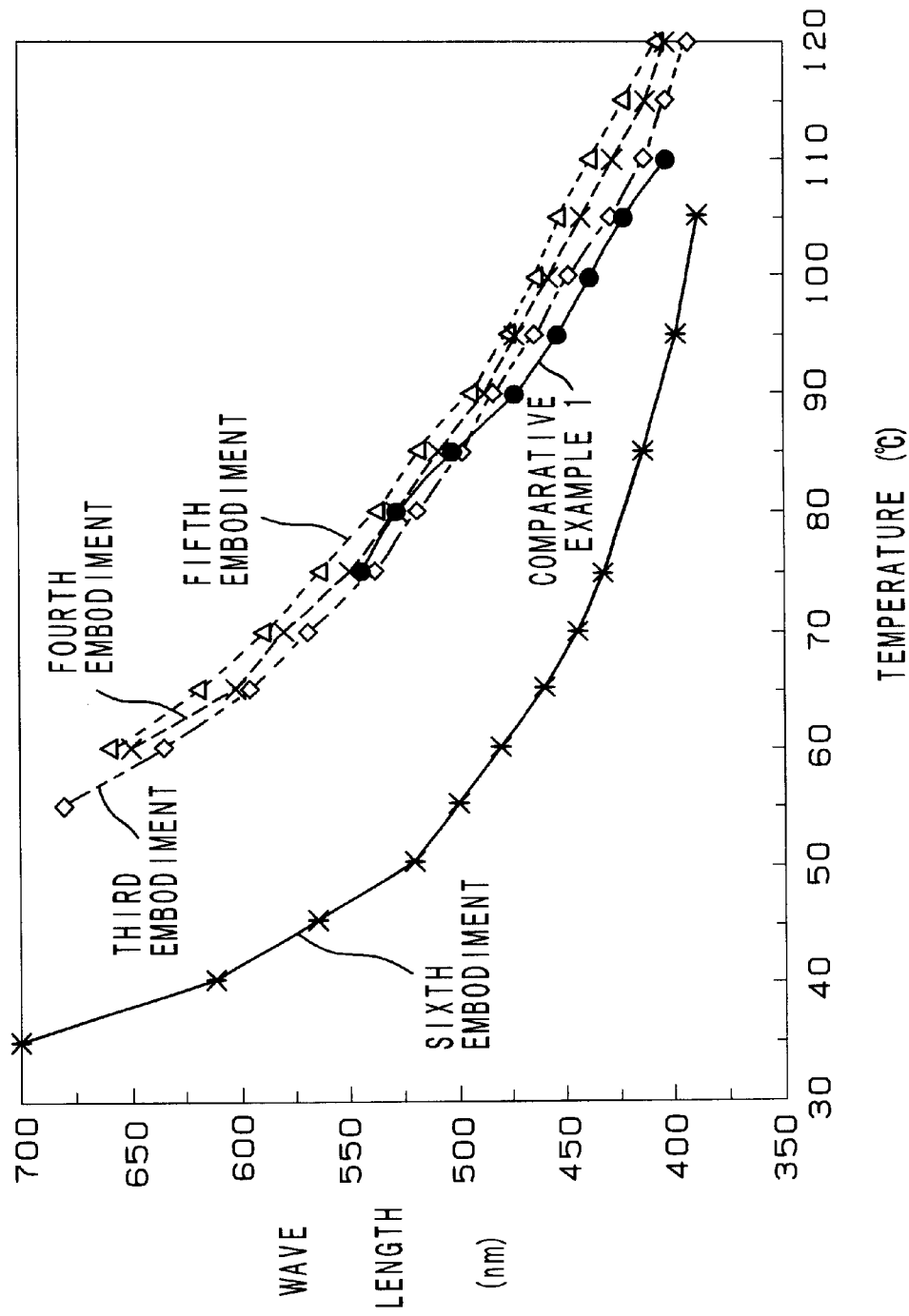
FIG. 12 is a graph which shows the dependency of the reflected color to the cooling temperature of recording media.
Figure 13:
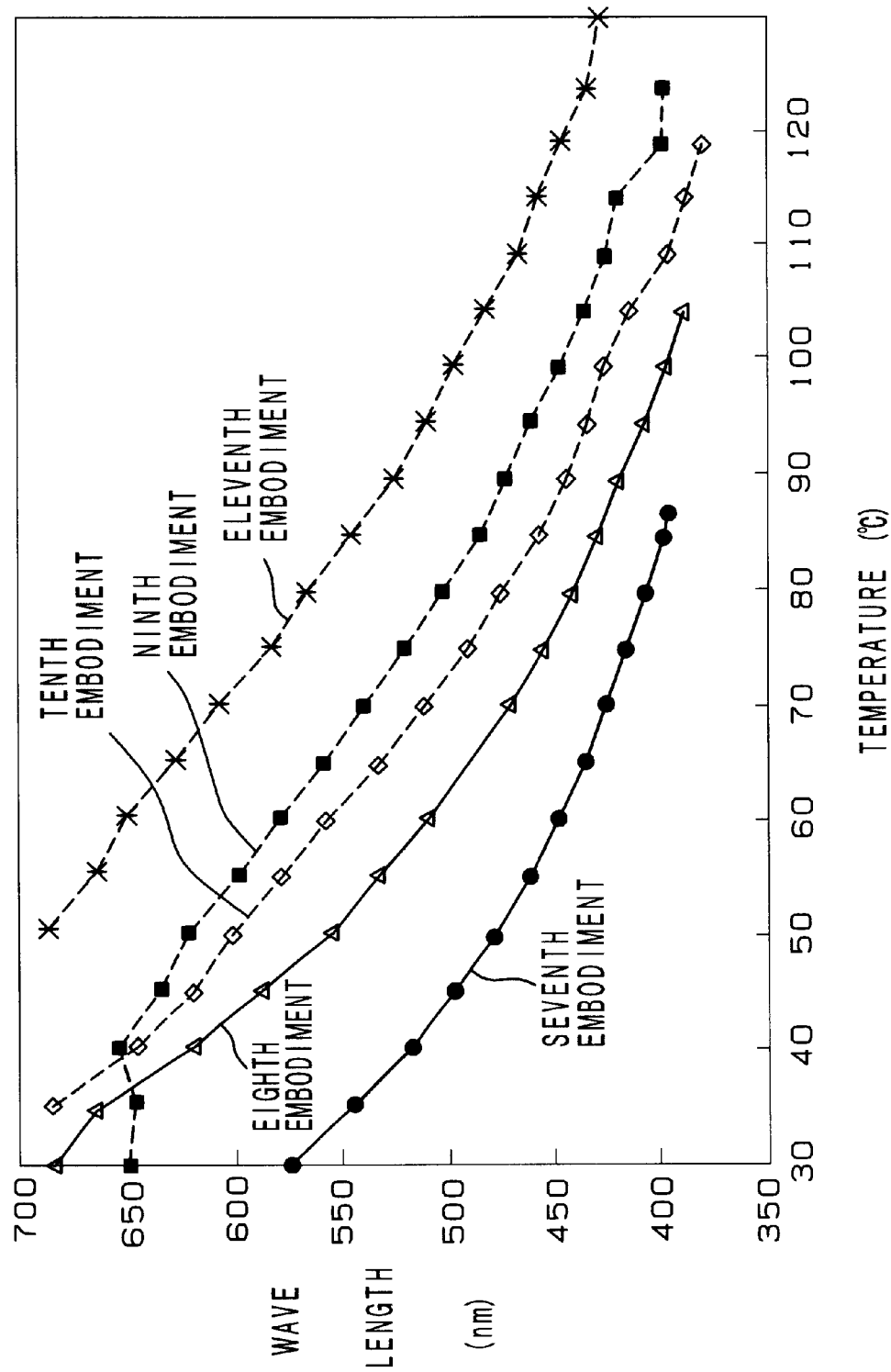
FIG. 13 is a graph which shows the dependency of the reflected color to the cooling temperature of recording media.

In FIGS. 12 and 13 which show the results, the x-axis indicates the temperature, and the y-axis indicates the peak wavelength in the reflectance spectrum at the temperature. As is apparent from FIGS. 12 and 13, in the recording media according to the third through eleventh embodiments, the variable range of reflected color and the range of temperature which permitted the variation of reflected color were wide, compared with the comparative example 1.

Dependency of Reflected Light to Heating Temperature

Figure 14:
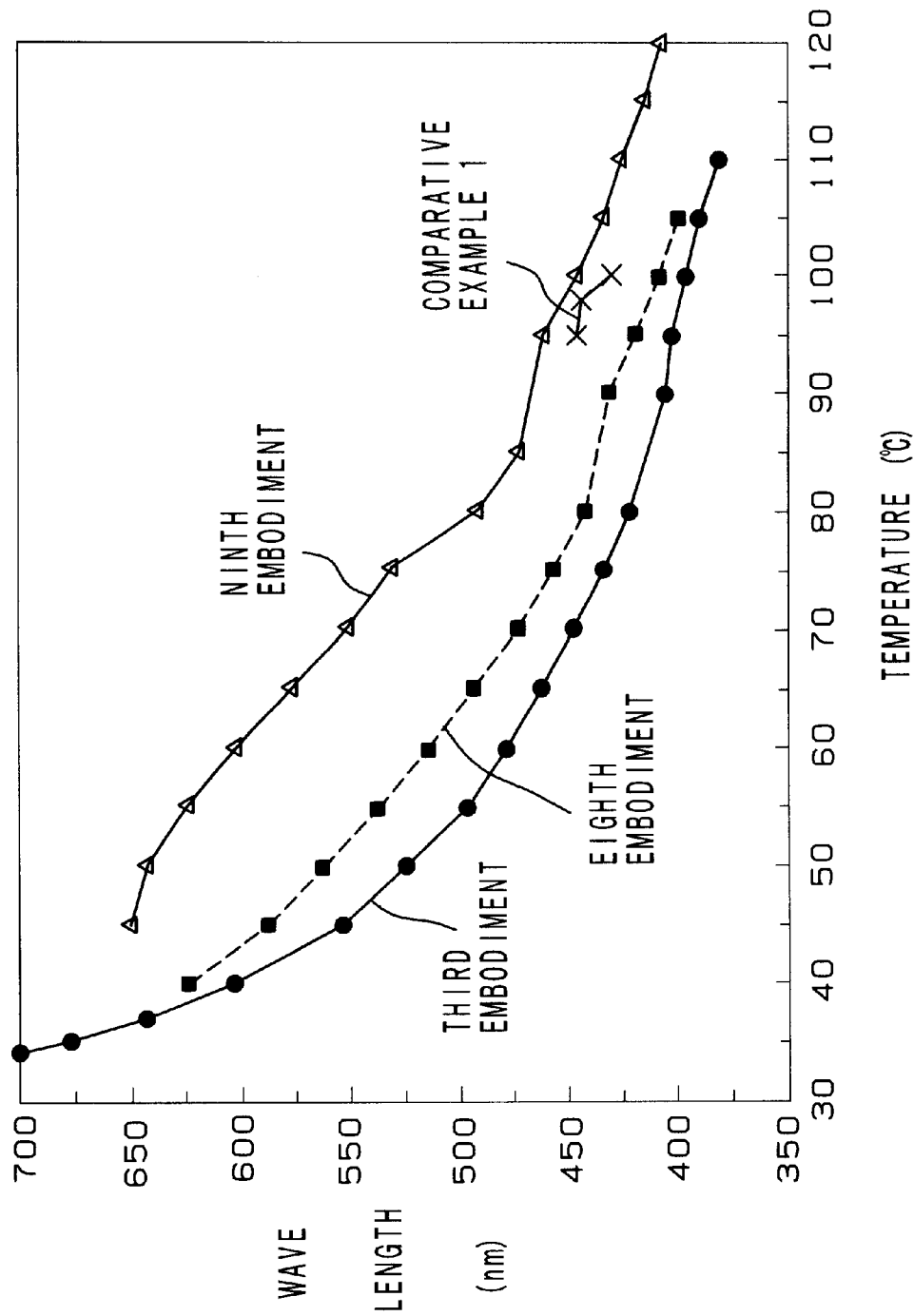
FIG. 14 is a graph which shows the dependency of the reflected color to the heating temperature of recording media.

With respect to the recording media according to the third, eighth, ninth embodiments and the comparative example 1, the dependency of the reflected light to the heating temperature was measured, and the results were shown by FIG. 14. The measurement was carried out as follows: each of the recording media was placed on a hot stage, and the temperature was raised to 150° C. so that the liquid crystal compound(s) would melt; thereafter, the recording medium was cooled to a room temperature; next, the temperature was raised by 5° C. at a time while each temperature was kept for two minutes; and in the meantime, while light is radiated from the position at a right angle to the recording medium (from right above of the recording medium), the reflectance spectrum was measured by a spectrocolorimeter (instant multi-photometry system: MCPD-2000 made by Otsuka Electrons Co., Ltd.) located in a position at an angle of 70°.

In FIG. 14, which shows the results, the x-axis indicates the temperature, and the y-axis indicates the peak wavelength of the reflectance spectrum at the temperature. As is apparent from FIG. 14, the recording media according to the third, eighth and ninth embodiments were enantiotropic, and the variable range of reflected color and the temperature range which permitted the variation of reflected color were wide. On the other hand, the recording medium according to the comparative example 1 was monotropic, and the reflected color hardly changed.

Twelfth Embodiment of the Recording Medium

A rewritable thermosensible recording medium according to the twelfth embodiment is of the same structure as the recording medium 1A shown by FIG. 4. The base layer 2, the intermediate layer 3 and the protective layer 5 of the twelfth embodiment are made of the same materials as those of the third embodiment. The recording layer 4 is a liquid crystal layer containing a low molecular cholesteric liquid crystal compound and a nematic liquid crystal compound. Specifically, the low molecular cholesteric liquid crystal compound of the chemical formula ($D_1$) and a nematic liquid crystal ester compound shown by the following chemical formula (K) were mixed and dissolved in toluene at a ratio by weight of 9:1:100. This solution was coated on the intermediate layer 3 by a blade and was heated and dried to be made into a rewritable thermosensible recording layer 4 with a thickness of 10 μm. The thickness of the recording layer 4 is desirably within a range from 3 μm to 50 μm, and more desirably within a range from 6 μm to 30 μm.

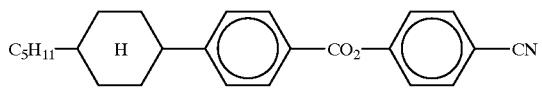

(K)

When the recording medium of the above construction is heated to a temperature within a range from 65° C. to 125° C., the liquid crystal exhibits a cholesteric phase, in which the herical axis is perpendicular to the intermediate layer 3, and reflects light of a specified wavelength according to the temperature. When the temperature is approximately 65° C., the liquid crystal shows red; when the temperature is approximately 100° C., the liquid crystal shows green; and when the temperature is approximately 120° C., the liquid crystal shows blue. Then, when the liquid crystal is cooled rapidly from these temperatures, the liquid crystal is solidified while remaining in the reflective state.

Also, when the liquid crystal is heated to a temperature over approximately 130° C. and thereafter cooled rapidly, the liquid crystal becomes transparent. Hence, when the recording medium is heated to a temperature over approximately 130° C. by a heat roller or the like and thereafter cooled rapidly, the whole surface of the recording layer 4 becomes transparent. In this state, a black display can be seen to an observer viewing from the direction "A" because visible light is absorbed in the intermediate layer 3.

When the recording medium is partly heated and cooled rapidly by use of a known thermal head, the heated part shows a color according to the heated temperature. In FIG. 4, the reference number 4a indicates a part in a transparent state, and the reference number 4b indicates a part left in a cholesteric phase. Accordingly, when writing in the recording medium is carried out at 100° C., a green-on-black display can be seen to an observer viewing from the direction "A". By carrying out writing at 65° C., 100° C. and 120° C. selectively, full-color display is possible. In the twelfth embodiment, a low-reflectance part can be realized by mixing minuscule black portions in that part.

In the recording medium according to the twelfth embodiment, a display color of the liquid crystal is seen on a black background. When a coloring agent which reflects light within a specified wavelength range is added to the intermediate layer 3, a display color of the liquid crystal can be seen on a background of a color determined by the coloring agent. A white background can be realized by arranging minuscule portions of blue, green and red in areas with no image information in mosaic, whereby the areas can be seen as white macroscopically.

According to the twelfth embodiment, the melting point of the base layer 2 is not lower than 200° C.; the melting point of the intermediate layer 3 is not lower than 200° C.; the crystallization point of the protective layer 5 is not lower than 200° C.; and the melting point of the recording layer 4 is 130° C. Even when the recording layer 4 is liquefied by being heated to 130° C. or higher at the time of writing or erasing, as long as the base layer 2, the intermediate layer 3 and the protective layer 5 are kept at a temperature not higher than the melting points thereof, the mechanical strength of the layers 2, 3 and 4 can be maintained, and the thickness of the recording layer 4 can be maintained against the pressure exerted by the thermal head. If spherical spacers are mixed in the recording layer 4, the thickness of the recording layer 4 can be maintained more positively.

In the twelfth embodiment, carbon black is added to the intermediate layer 3 so that the intermediate layer 3 can obtain a function of absorbing light within the whole visible light wavelength range. For example, if a function of reflecting blue is imparted to the intermediate layer 3 and if writing is carried out in such a way that the liquid crystal will reflect yellow, a display in blue and white can be made. Of course, by adopting this method, a multi-color display becomes possible. In this method, the white reflection amount is the sum of the blue reflection amount of the intermediate layer and the yellow reflection amount of the recording layer 4. The resultant reflection amount is greater than the white reflection amount in a case of displaying white by arranging the three primary colors of blue, green and red in mosaic, and thus, a brighter display can be obtained. Also, a more colorful display becomes possible by making the intermediate layer 3 reflect light of a plurality of colors.

In the twelfth embodiment, the display color changed within temperature range from 65° C. to 125° C., and the reflected light was of a wavelength range from 600 nm to 440 nm. When printing was carried out on the recording medium according to the twelfth embodiment by use of a hot stamp, color variations in a wide range was possible, and the recording medium attained high recording performance. Needless to say, the recording medium is capable of being subjected to image writing and image erasing by use of the thermal printer shown by FIG. 6 and the laser printer shown by FIG. 18.

Thirteenth Embodiment of the Recording Medium

A recording medium according to the thirteenth embodiment is of the same structure as the recording medium 1A shown by FIG. 4. The base layer 2, the intermediate layer 3 and the protective layer 5 are made of the same materials of those of the third embodiment. The recording layer 4 of this recording medium was formed as follows: the low molecular cholesteric liquid crystal compound of the chemical formula ($D_1$) and a nematic liquid crystal cyanobiphenyl compound shown by the following chemical formula (L) were mixed and dissolved in toluene at a ratio by weight of 8.5:1.5:100; this solution was coated on the intermediate layer 3 by a blade and was heated and dried to be made into a rewritable thermosensible recording layer 4 with a thickness of 10 μm. The thickness of the recording layer 4 is desirably within a range from 3 μm to 50 μm, and more desirably within a range from 6 μm to 30 μm.

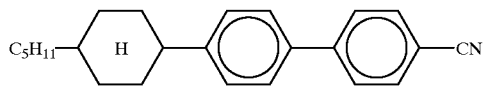

(L)

In the thirteenth embodiment, the display color changed within a temperature range from 65° C. to 125° C., and the reflected light was of a wavelength range from 670 nm to 460 nm. When printing was carried out on the recording medium according to the thirteenth embodiment by use of a hot stamp, color variations in a wide range was possible, and the recording medium attained high recording performance. Needless to say, the recording medium is capable of being subjected to image writing and image erasing by use of the thermal printer and the laser printer described above.

Fourteenth Embodiment of the Recording Medium

A recording medium according to the fourteenth embodiment is of the same structure as the recording medium 1B shown by FIG. 5. The recording layer 41 of this recording medium is a composite of a low molecular cholesteric liquid crystal compound, a nematic liquid crystal compound and polymeric resin. The recording layer 41 is separated into liquid crystal sections 41a by a resin layer 41b. Further, spherical spacers 6 of resin, inorganic oxide or the like are mixed in the recording layer 41.

Next, the materials and the producing method are described referring to a specific example.

Silica spacers 6 with an average particle diameter of 15 $\mu$m were dispersed in ethanol and sprayed on a transparent PES (polyether sulfone) film. Next, with the cholesteric liquid crystal compound of the chemical formulas ($D_1$), a nematic liquid crystal bicyclohexile compound shown by the following chemical formula (M) was mixed at 5 wt %. The mixture and bifunctional acrylate R712 (made by Nippon Kayaku Co., Ltd.), which has an aromatic ring, containing a photopolymerization initiator DAROCUR1173 (made by Chiba-Geigy (Japan)) at 3 wt % were mixed with each other at a ratio by weight of 17:3. Thus, a liquid crystal composition was prepared. This liquid crystal composition was coated on the base layer 2, and a transparent polyether sulfon film with a thickness of 2 $\mu$m was laid thereon as a protective layer 5.

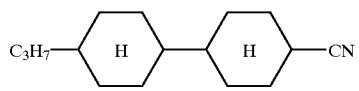

(M)

Next, while the protective layer 5 was pressed, ultraviolet rays of 0.02 mW/cm² were radiated for one hour. Thus, a composite layer (recording layer 41) with a thickness of 15 $\mu$m was formed. Further, black paint was coated on the reverse side of the base layer 2 to form a light absorbing layer 7.

In the fourteenth embodiment, the display color changed within a temperature range from 60° C. to 110° C., and the reflected light was of a wavelength range from 660 nm to 450 nm. When printing was carried out on the recording medium of the fourteenth embodiment by use of a hot stamp, color variations in a wide range were possible, and the recording medium attained high recording performance. Needless to say, the recording medium is capable of being subjected to image writing and image erasing by use of the thermal printer and the laser printer described above.

Fifteenth Embodiment of the Recording Medium

A recording medium according to the fifteenth embodiment is of the same structure as the recording medium 1C. as shown by FIG. 6.

Specifically, on both sides of a transparent PET (polyethylene terephthalate) film with a thickness of 200 $\mu$m, aluminum layers with a thickness of approximately 60 nm were formed as the intermediate layers 3 which reflect light. Next, silica spacers 6 with an average particle diameter of 8 $\mu$m, the liquid crystal compound of the chemical formula ($D_1$) and a nematic liquid crystal phenyldioxane compound shown by the following chemical formula (N) were mixed and dissolved in toluene. The mixing ratio by weight of the liquid crystal compound of the chemical formula ($D_1$), the liquid crystal compound of the chemical formula (N) and the toluene was 9:1:100. This solution was coated on the intermediate layers 3 by a blade and was heated and dried to be made into rewritable thermosensible recording layers 4 with a thickness of 8 $\mu$m. Further, on the recording layers 4, polyester films with a thickness of 5 $\mu$m were laid, and these were heated to 100° C. to adhere to one another.

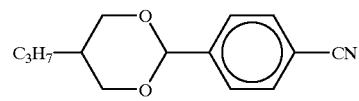

(N)

In the fifteenth embodiment, the display color changed within a temperature range from 58° C. to 95° C., and the reflected light was of a wavelength range from 580 nm to 430 nm. When printing was carried out on the recording medium of the fifteenth embodiment by use of a hot stamp, color variations in a wide range were possible, and the recording medium attained high recording performance. Needless to say, the recording medium is capable of being subjected to image writing and image erasing by use of the thermal printer and the laser printer described above.

Comparative Example 2

A recording medium of the comparative example 2 is of the same structure as the recording medium 1A shown by FIG. 4. The base layer 2, the intermediate layer 3 and the protective layer 5 of the comparative example 2 are made of the same materials as those of the third embodiment. The recording layer 4 of the comparative example 2 was formed as follows: the liquid crystal compound of the chemical formula ($D_1$) is dissolved in toluene at a ratio by weight of 10:100; this solution was coated on the intermediate layer 3 by a blade and heated and dried to be made into a rewritable thermosensible recording layer 4 with a thickness of 10 $\mu$m.

In the comparative example 2, the display color changed within a temperature range from 75° C. to 110° C., and the reflected light was of a wavelength range from 550 nm to 410 nm. When printing on the recording medium was carried out by use of a hot stamp, the temperature control was difficult because the variable range of reflected color and the range of temperature which permitted the variation of reflected color were narrow, and chromatic unevenness occurred.

Dependency of Reflected Color to Cooling Temperature

Figure 15:
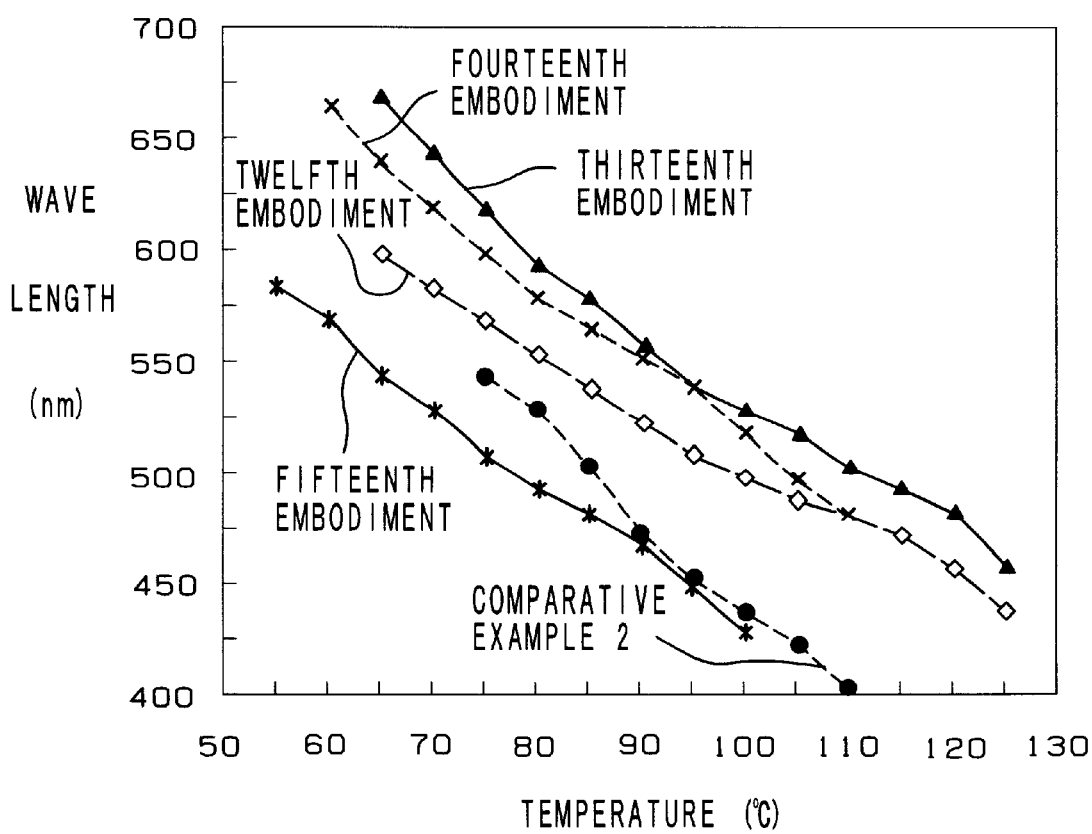
FIG. 15 is a graph which shows the dependency of the reflected color to the cooling temperature of recording media.

With respect to the recording media according to the twelfth through fifteenth embodiments and the comparative example 2, the dependency of the reflected light to the cooling temperature was measured. The results are shown by FIG. 15. The measurement was carried out as follows: each of the recording media was placed on a hot stage and was heated to 130° C. so that the liquid crystal compound(s) would melt; thereafter, the temperature was dropped by 5° C. at a time while each temperature was kept for two minutes; and in the meantime, while light is radiated from the position at a right angle to the recording medium (from right above of the recording medium), the reflectance spectrum was measured by a spectrocolorimeter (instant multi-photometry system: MCPD-2000 made by Otsuka Electrons Co., Ltd.) located in a position at an angle of 70°.

In FIG. 15 which shows the results, the x-axis indicates the temperature, and the y-axis indicates the peak wavelength in the reflectance spectrum at the temperature. As is apparent from FIG. 15, in the recording media according to the twelfth through fifteenth embodiments, the variable range of reflected color and the range of temperature which permitted the variation of reflected color were wide, compared with the recording medium of the comparative example 2.

Other Embodiments

For the recording layers, besides the compounds of the chemical formulas (A) and (D) through (J), various low molecular cholesteric compounds can be used. It is possible to use compounds which are adopted to have carbons in the alkyl chains different in number from the formulas ($D_1$), ($E_1$), ($J_1$), ($I_1$), ($G_1$) and ($F_1$) and compounds which are of chemical formulas similar to the formulas ($D_1$), ($E_1$), ($E_2$), ($I_1$), ($E_3$), ($G_1$) and ($F_1$) and are adopted to have one cholesterol ring.

Although the present invention has been described with reference to the preferred embodiments above, it is to be noted that various changes and modifications are possible to those who are skilled in the art. Such changes and modifications are to be understood as being within the scope of the present invention.

What is claimed is:

1. A rewritable thermosensible recording medium comprising:
   a sheet-like base layer; and
   a recording layer which contains a chemical composition of at least two low molecular weight cholesteric liquid crystal compounds, the chemical composition exhibiting a cholesteric phase at a temperature higher than room temperature, the chemical composition reflecting light of a wavelength within a visible range depending on a threshold temperature, and the chemical composition being solidified while remaining in a reflective state thereof by being cooled rapidly from the threshold temperature, wherein the threshold temperature is not lower than 50° C.

2. A rewritable thermosensible recording medium as claimed in claim 1, wherein the recording layer is provided on a front surface and on a back surface of the base layer.

3. A rewritable thermosensible recording medium as claimed in claim 1, wherein the recording layer is a composite of the liquid crystal compounds and polymeric resin.

4. A rewritable thermosensible recording medium as claimed in claim 1, further comprising an intermediate layer provided between the base layer and the recording layer, the intermediate layer having a smooth surface on a side abutting on the recording layer.

5. A rewritable thermosensible recording medium as claimed in claim 1, further comprising a protective layer provided on the recording layer.

6. A rewritable thermosensible recording medium as claimed in claim 1, wherein at least one of the cholesteric liquid crystal compounds contained in the recording layer has a molecular weight of 1000 to 1500.

7. A rewritable thermosensible recording medium as claimed in claim 1, wherein the recording layer contains an additive containing at least a plasticizer.

8. A rewritable thermosensible recording medium as claimed in claim 1, wherein the base layer is made of black plastic.

9. A rewritable thermosensible recording medium as claimed in claim 1, wherein the base layer is made of plastic, glass, metal or a composite material of plastic and metal.

10. A rewritable thermosensible recording medium as claimed in claim 1, wherein the recording layer contains spacers.

11. A rewritable thermosensible recording medium as claimed in claim 5, wherein each of the spacers are spherical.

12. A rewritable thermosensible recording medium as claimed in claim 1, wherein the recording layer contains a polymeric material.

13. A rewritable thermosensible recording medium as claimed in claim 1, wherein each of the cholesteric liquid crystal compounds has a molecular weight of 1000 to 1500.

* * * * *

UNITED STATES PATENT AND TRADEMARK OFFICE
CERTIFICATE OF CORRECTION

PATENT NO.   : 6,379,850 B1
DATED        : April 30, 2002
INVENTOR(S)  : Hideaki Ueda et al.

It is certified that error appears in the above-identified patent and that said Letters Patent is hereby corrected as shown below:

Title page,
Item [57], ABSTRACT,
Delete:

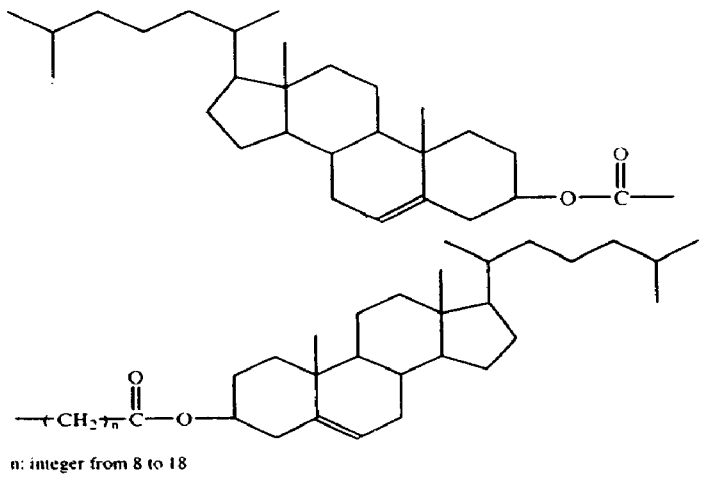

n: integer from 8 to 18

Insert:

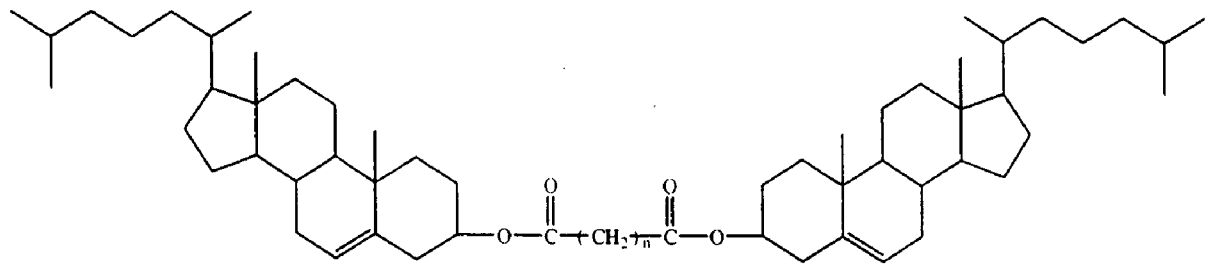

n: integer from 8 to 18

UNITED STATES PATENT AND TRADEMARK OFFICE
CERTIFICATE OF CORRECTION

PATENT NO. : 6,379,850 B1
DATED : April 30, 2002
INVENTOR(S) : Hideaki Ueda et al.

It is certified that error appears in the above-identified patent and that said Letters Patent is hereby corrected as shown below:

Column 28,
Line 39, delete "claim 5", and insert -- claim 10 --.

Signed and Sealed this

Twenty-sixth Day of November, 2002

Attest:

Attesting Officer

JAMES E. ROGAN
Director of the United States Patent and Trademark Office